(12) United States Patent
Ollila et al.

(10) Patent No.: US 10,764,567 B2
(45) Date of Patent: Sep. 1, 2020

(54) DISPLAY APPARATUS AND METHOD OF DISPLAYING

(71) Applicant: Varjo Technologies Oy, Helsinki (FI)

(72) Inventors: Mikko Ollila, Tampere (FI); Klaus Melakari, Oulu (FI); Oiva Arvo Oskari Sahlsten, Salo (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/253,954

(22) Filed: Jan. 22, 2019

(65) Prior Publication Data
US 2020/0236347 A1 Jul. 23, 2020

(51) Int. Cl.
*H04N 13/383* (2018.01)
*G02B 5/04* (2006.01)
*H04N 13/346* (2018.01)
*H04N 13/344* (2018.01)

(52) U.S. Cl.
CPC ........... *H04N 13/383* (2018.05); *G02B 5/045* (2013.01); *H04N 13/344* (2018.05); *H04N 13/346* (2018.05)

(58) Field of Classification Search
CPC .. H04N 13/383; H04N 13/344; H04N 13/346; G02B 5/045
See application file for complete search history.

(56) References Cited

U.S. PATENT DOCUMENTS 6,393,216 B1 * 5/2002 Ootsuka ............... G03B 17/00
396/296
9,711,114 B1 7/2017 Konttori et al.
9,983,413 B1 5/2018 Sahlsten et al.
(Continued)

FOREIGN PATENT DOCUMENTS

JP 2018025600 A * 2/2018 ............. G02B 6/003

OTHER PUBLICATIONS

Notification of Transmittal of the International Search Report and the Written Opinion of the International Searching Authority, or the Declaration, Application No. PCT/FI2019/050888, dated May 4, 2020, 13 pages.

*Primary Examiner* — Jonathan R Messmore
(74) *Attorney, Agent, or Firm* — Ziegler IP Law Group LLC.

(57) ABSTRACT

A display apparatus includes means for detecting gaze direction of user; processor configured to process input image based upon gaze direction to generate first and second images; first and second image renderers to render first and second images; optical combiner; first array of micro-prisms to split light emanating from second image renderer into multiple directions to produce multiple projections of second image; optical element to direct said multiple projections towards optical combiner; and optical shutter arranged between optical element and optical combiner, wherein optical shutter allows given portion of said multiple projections to pass, whilst blocking remaining portion of said multiple projections. The optical combiner optically combines projection of first image with given portion of said multiple projections, to produce on image plane output image having spatially-variable angular resolution. The processor controls optical shutter based upon detected gaze direction, whilst first and second images are being rendered.

10 Claims, 14 Drawing Sheets

(56) References Cited

U.S. PATENT DOCUMENTS

| | | | |
|---|---|---|---|
| 2006/0133725 A1* | 6/2006 | Wang | G02B 6/3524 385/22 |
| 2016/0377865 A1* | 12/2016 | Alexander | G03H 1/2645 345/8 |
| 2016/0379606 A1 | 12/2016 | Kollin et al. | |
| 2019/0212560 A1* | 7/2019 | Sugiyama | G02B 19/0061 |

* cited by examiner

DISPLAY APPARATUS AND METHOD OF DISPLAYING

TECHNICAL FIELD

The present disclosure relates generally to display apparatuses; and more specifically, to display apparatuses comprising means for detecting gaze direction, processors, image renderers, optical combiners, arrays of micro-prisms, optical elements and optical shutters. Moreover, the present disclosure also relates to methods of displaying via the aforementioned display apparatuses.

BACKGROUND

Nowadays, several technologies (for example, such as virtual reality, augmented reality, and the like) are being developed for presenting a simulated environment to a user. Such technologies provide the user with a feeling of complete involvement (namely, immersion) within the simulated environment by employing techniques such as stereoscopy. As a result, when the user views the simulated environment, he/she is provided with an enhanced perception of reality around him/her. Moreover, such simulated environments relate to fully virtual environments (namely, virtual reality environments) as well as real world environments including virtual objects therein (for example, such as augmented reality environments, mixed reality environments, and the like).

Typically, the user uses a specialized device (for example, such as a virtual reality device, an augmented reality device, a mixed reality device, and the like) for viewing such simulated environments. Generally, the specialized device displays different views of a given image on separate display optics for both eyes of the user. As a result, the user is able to perceive stereoscopic depth within the given image. Furthermore, the specialized device also includes several optical elements which are employed to capture images, render images, optically modify images, direct projections of images, and the like. Nowadays, such specialized devices are being designed to imitate a physiology of human vision for displaying gaze contingent foveated images to the user. Examples of the specialized devices include virtual reality headsets, a pair of virtual reality glasses, augmented reality headsets, a pair of augmented reality glasses, mixed reality headsets, a pair of mixed reality glasses, and the like.

However, conventional specialized devices have certain limitations. Firstly, an arrangement of the optical elements within such specialized devices is extremely complex. Therefore, dynamically rearranging (namely, adjusting positions of) the optical elements according to gaze direction of the user is difficult. Secondly, since actuators are employed for physically moving the optical elements, power consumption of such specialized devices increases. Moreover, the physical movement of the optical components is slow and increases latency in displaying the simulated environments. Thirdly, in order to provide space for allowing movement of the optical elements, the specialized devices are designed to be large in size. Such large-sized devices are often bulky and cumbersome to use.

Therefore, in light of the foregoing discussion, there exists a need to overcome the aforementioned drawbacks associated with conventional devices for displaying simulated environments.

SUMMARY

The present disclosure seeks to provide a display apparatus. The present disclosure also seeks to provide a method of displaying, via such a display apparatus. The present disclosure seeks to provide a solution to the existing problems such as complex arrangement of components, high power consumption due to moving components, and bulkiness, that are associated with conventional display apparatuses. An aim of the present disclosure is to provide a solution that overcomes at least partially the problems encountered in prior art, and provides a display apparatus having a simple arrangement of optical components, low latency, low power consumption, and compact design.

In one aspect, an embodiment of the present disclosure provides a display apparatus comprising:
  means for detecting a gaze direction of a user with respect to an image plane;
  a processor coupled to said means, wherein the processor or an image source communicably coupled to the processor is configured to process an input image, based upon the detected gaze direction, to generate a first image and a second image;
  a first image renderer per eye, the first image renderer being employed to render the first image;
  a second image renderer per eye, the second image renderer being employed to render the second image;
  an optical combiner;
  a first array of micro-prisms arranged in a proximity of an image rendering surface of the second image renderer, wherein the micro-prisms of the first array split light emanating from pixels of the second image renderer into a plurality of directions to produce a plurality of projections of the second image, and wherein each micro-prism of the first array splits light emanating from at least one corresponding pixel into said plurality of directions;
  an optical element arranged on an optical path between the first array of micro-prisms and the optical combiner, the optical element being employed to direct the plurality of projections of the second image towards the optical combiner; and
  an optical shutter arranged on said optical path, between the optical element and the optical combiner, wherein the optical shutter selectively allows a given portion of the plurality of projections of the second image to pass through towards the optical combiner, whilst blocking a remaining portion of the plurality of projections of the second image,
wherein the optical combiner optically combines a projection of the first image with the given portion of the plurality of projections of the second image, to produce on the image plane an output image having a spatially-variable angular resolution,
further wherein the processor controls the optical shutter based upon the detected gaze direction, whilst the first image and the second image are being rendered.

In another aspect, an embodiment of the present disclosure provides a method of displaying, via a display apparatus, the method comprising:
  detecting a gaze direction of a user with respect to an image plane;
  processing an input image, based upon the detected gaze direction, to generate a first image and a second image;
  rendering, via a first image renderer and a second image renderer of the display apparatus, the first image and the second image, respectively;
  splitting, via a first array of micro-prisms of the display apparatus, light emanating from pixels of the second image renderer into a plurality of directions to produce a plurality of projections of the second image, wherein each micro-prism of the first array splits light emanating from at least one corresponding pixel into said plurality of directions;

employing an optical element of the display apparatus to direct the plurality of projections of the second image towards an optical combiner of the display apparatus, the optical element being arranged on an optical path between the first array of micro-prisms and the optical combiner;

controlling an optical shutter of the display apparatus to selectively allow a given portion of the plurality of projections of the second image to pass through towards the optical combiner, whilst blocking a remaining portion of the plurality of projections of the second image, wherein the optical shutter is arranged on said optical path, between the optical element and the optical combiner, and wherein the optical shutter is controlled based upon the detected gaze direction, whilst the first image and the second image are being rendered; and optically combining, via the optical combiner, a projection of the first image with the given portion of the plurality of projections of the second image, to produce on the image plane an output image having a spatially-variable angular resolution.

Embodiments of the present disclosure substantially eliminate or at least partially address the aforementioned problems in the prior art, and facilitate production of output images having spatially-variable angular resolutions on an image plane, without increasing design complexity and power consumption of the display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 5A and 5B illustrate front and side views of a given micro-prism of a first array of micro-prisms, respectively, while

FIG. 7C illustrates the second image to be rendered, while

FIG. 8C illustrates of the second image to be rendered, while

FIG. 9C illustrates the second image to be rendered, while

FIG. 10C illustrates the second image to be rendered, while

Figure 1:
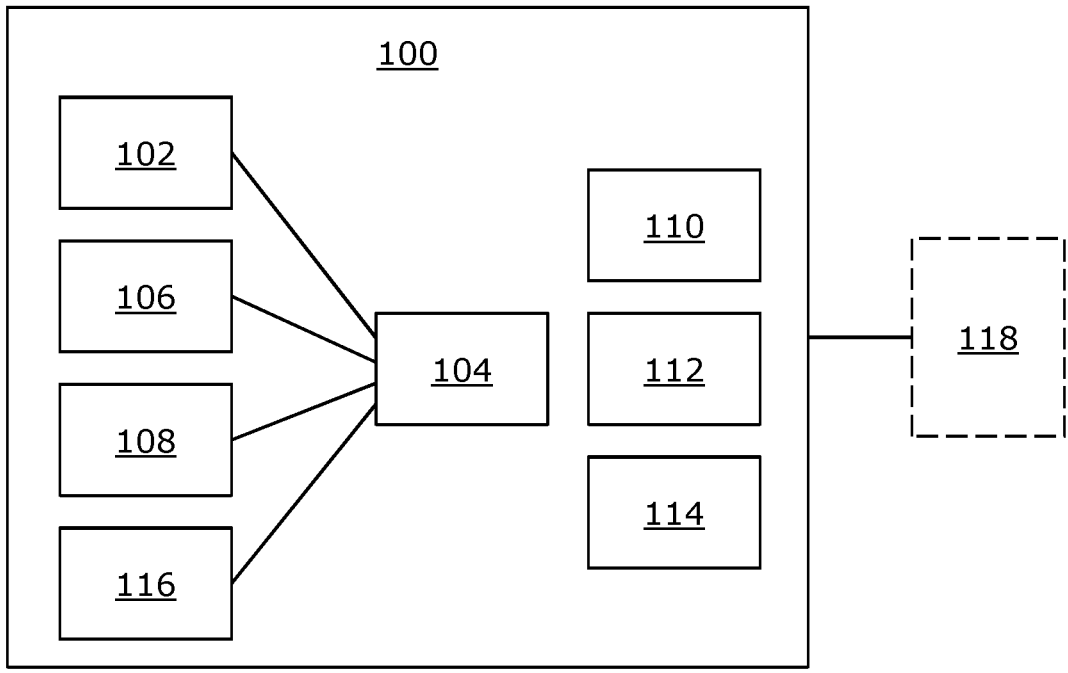
FIGS. 1 and 2 are block diagrams of architectures of a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:

means for detecting a gaze direction of a user with respect to an image plane;

a processor coupled to said means, wherein the processor or an image source communicably coupled to the processor is configured to process an input image, based upon the detected gaze direction, to generate a first image and a second image;

a first image renderer per eye, the first image renderer being employed to render the first image;

a second image renderer per eye, the second image renderer being employed to render the second image;

an optical combiner;

a first array of micro-prisms arranged in a proximity of an image rendering surface of the second image renderer, wherein the micro-prisms of the first array split light emanating from pixels of the second image renderer into a plurality of directions to produce a plurality of projections of the second image, and wherein each micro-prism of the first array splits light emanating from at least one corresponding pixel into said plurality of directions;

an optical element arranged on an optical path between the first array of micro-prisms and the optical combiner, the optical element being employed to direct the plurality of projections of the second image towards the optical combiner; and an optical shutter arranged on said optical path, between the optical element and the optical combiner, wherein the optical shutter selectively allows a given portion of the plurality of projections of the second image to pass through towards the optical combiner, whilst blocking a remaining portion of the plurality of projections of the second image, wherein the optical combiner optically combines a projection of the first image with the given portion of the plurality of projections of the second image, to produce on the image plane an output image having a spatially-variable angular resolution, further wherein the processor controls the optical shutter based upon the detected gaze direction, whilst the first image and the second image are being rendered.

In another aspect, an embodiment of the present disclosure provides a method of displaying, via a display apparatus, the method comprising:

detecting a gaze direction of a user with respect to an image plane;

processing an input image, based upon the detected gaze direction, to generate a first image and a second image;

rendering, via a first image renderer and a second image renderer of the display apparatus, the first image and the second image, respectively;

splitting, via a first array of micro-prisms of the display apparatus, light emanating from pixels of the second image renderer into a plurality of directions to produce a plurality of projections of the second image, wherein each micro-prism of the first array splits light emanating from at least one corresponding pixel into said plurality of directions;

employing an optical element of the display apparatus to direct the plurality of projections of the second image towards an optical combiner of the display apparatus, the optical element being arranged on an optical path between the first array of micro-prisms and the optical combiner;

controlling an optical shutter of the display apparatus to selectively allow a given portion of the plurality of projections of the second image to pass through towards the optical combiner, whilst blocking a remaining portion of the plurality of projections of the second image, wherein the optical shutter is arranged on said optical path, between the optical element and the optical combiner, and wherein the optical shutter is controlled based upon the detected gaze direction, whilst the first image and the second image are being rendered; and optically combining, via the optical combiner, a projection of the first image with the given portion of the plurality of projections of the second image, to produce on the image plane an output image having a spatially-variable angular resolution.

The present disclosure provides the aforementioned display apparatus and method to be used for producing on the image plane a sequence of output images having a spatially-variable angular resolutions, without increasing complexity of an arrangement of optical components within the display apparatus. This allows for conveniently implementing active foveation within the display apparatus, with nil or minimal moving components. Moreover, components of the described display apparatus consume minimal power, and reduce latency in displaying the sequence of output images. Beneficially, due to a simple arrangement of components within the display apparatus, the display apparatus can be designed to be compact. This considerably enhances the user's experience of using the display apparatus.

Throughout the present disclosure, the term "display apparatus" refers to specialized equipment that is configured to present a simulated environment to the user when the display apparatus in operation is worn by the user on his/her head. In such an instance, the display apparatus acts as a device (for example, such as a virtual reality headset, a pair of virtual reality glasses, an augmented reality headset, a pair of augmented reality glasses, a mixed reality headset, a pair of mixed reality glasses, and so forth) that is operable to present a visual scene of the simulated environment to the user. The display apparatus may also commonly be referred to as "head-mounted display apparatus".

It will be appreciated that the visual scene of the simulated environment comprises a sequence of output images. As an example, the visual scene may be a virtual reality movie. As another example, the visual scene may be an educational augmented reality video. As yet another example, the visual scene may be a mixed reality game.

Throughout the present disclosure, the term "means for detecting the gaze direction" refers to specialized equipment for detecting and/or tracking the gaze direction of the user. Such specialized equipment are well known in the art. For example, the means for detecting the gaze direction can be implemented using contact lenses with sensors, cameras monitoring a position of a pupil of the user's eye, infrared (IR) light sources and IR cameras, a bright pupil-detection equipment, a dark pupil-detection equipment and the like. Beneficially, said means is arranged in a manner that it does not cause any obstruction in the user's view.

It will be appreciated that said means is employed to detect the gaze direction of the user repeatedly over a period of time, when the display apparatus in operation is worn by the user. Since the processor is coupled to the means for detecting the gaze direction of the user, the processor is configured to receive, from said means, information indicative of the detected gaze direction of the user. Optionally, the processor or the image source is configured to generate the first and second images, based upon an instantaneous gaze direction of the user detected during operation, in real-time or near real-time.

Throughout the present disclosure, the term "image plane" refers to a given imaginary plane on which the produced output image is visible to the user. Optionally, the image plane is at a distance that lies in a range of 25 cm to 400 cm from a perspective of a user's eye. More optionally, the image plane is at a distance that lies in a range of 50 cm to 100 cm from the perspective of the user's eye.

The processor could be implemented as hardware, software, firmware or a combination of these. The processor is coupled to various components of the display apparatus, and is configured to control the operation of the display apparatus.

Throughout the present disclosure, the term "image source" refers to equipment that, when employed, produces the input image. The image source is communicably coupled to the processor via a wireless interface or a wired interface.

Optionally, the image source comprises at least one camera that is employed to capture an image of a given real-world scene, wherein said image is to be utilized to produce the input image. In such a case, the image of the given real-world scene could be directly utilized as the input image, or may be processed to produce the input image.

Additionally or alternatively, optionally, the image source comprises a computer that produces the input image. In an embodiment, the input image is entirely generated by the computer. In another embodiment, the computer processes the image of the given real-world scene (captured by the at least one camera) for producing the input image. For example, the computer may add computer graphics to the image of the given real-world scene for producing the input image.

Throughout the present disclosure, the phrase "producing the input image" has been used to mean any of the following:

capturing the image of the given real-world scene using the at least one camera, and using said image as the input image;

generating computer graphics using the computer, and using said computer graphics as the input image; or capturing the image of the given real-world scene using the at least one camera and adding computer graphics to the image of the given real-world scene using the computer for producing the input image.

The input image is processed, based upon the detected gaze direction, to generate the first image and the second image. In such a case, the processor or the image source is configured to determine a region of interest of the input image based upon the detected gaze direction of the user. The input image is processed such that the first image corresponds to an entirety of the input image whereas the second image substantially corresponds to a region of interest of the input image.

Hereinabove, the phrase "the second image substantially corresponds to the region of interest of the input image" is used to mean that the second image corresponds to at least 80 percent of the region of interest of the input image; more optionally, to at least 90 percent of the region of interest of the input image; and yet more optionally, to at least 95 percent of the region of interest of the input image.

The term "region of interest" refers to a region of the input image whereat the gaze direction of the user is directed (namely, focused) when the user views the input image. In other words, the region of interest is a fixation region within the input image. When the gaze direction of the user is focused upon the region of interest, the region of interest is directed onto the fovea of the user's eyes, and is resolved to a much greater detail as compared to the remaining region(s) of the input image.

Optionally, an angular width of the first image lies in a range of 40 degrees to 220 degrees, while an angular width of the second image lies in a range of 5 degrees to 60 degrees. For example, the angular width of the first image may be from 40, 50, 60, 70, 80, 90, 100, 110, 120, 130, 140, 150, 160, 170, 180, 190, 200 or 210 degrees up to 50, 60, 70, 80, 90, 100, 110, 120, 130, 140, 150, 160, 170, 180, 190, 200, 210 or 220 degrees. Likewise, the angular width of the second image may be from 5, 10, 15, 20, 25, 30, 35, 40, 45, 50 or 55 degrees up to 10, 15, 20, 25, 30, 35, 40, 45, 50, 55 or 60 degrees. Herein, the term "angular width" refers to an angular width of a given image with respect to the perspective of the user's eye, namely with respect to a centre of the user's gaze. It will be appreciated that the angular width of the first image is larger than the angular width of the second image.

Optionally, an image resolution of the second image is greater than an image resolution of the first image. In other words, the second image has a greater number of pixel values associated therewith per unit area as compared to the first image. Throughout the present disclosure, the term "image resolution" refers to a detail an image holds (see reference: https://en.wikipedia.org/wiki/Image_resolution). The image resolution is typically measured as the number of pixel values per unit area associated with a given image. As an example, if the first and second images have 'X' and 'Y' pixel values per unit area, respectively, then 'Y' would be greater than 'X' (namely, Y>X).

Optionally, the first image is to be generated in a manner that a region of the first image that corresponds to the region of interest of the input image is masked. In other words, the region of the first image that corresponds to the second image is masked (for example, by dimming or darkening corresponding pixels). Furthermore, in such a case, the given portion of the plurality of projections of the second image is to substantially overlap with a projection of the masked region of the first image on the at least one optical combiner. Notably, the aforesaid masking operation obscures the region of interest depicted within the first image, so that the produced output image depicts the region of interest of the input image by utilizing only the second image. Hereinabove, by "substantially overlaps", it is meant that a misalignment between corresponding pixels of the second image and the pixels of the masked region of the first image lies within a range of 0 to 10 pixels, and more optionally, within a range of 0 to 5 pixels.

Throughout the present disclosure, the term "image renderer" refers to equipment that, when operated, renders a given image. Beneficially, a given image renderer has a same display resolution throughout its array of pixels. In other words, the given image renderer has a same pixel density throughout the entire array of pixels. When the given image is rendered via the given image renderer, a projection of the given image emanates from the image rendering surface of the given image renderer.

Throughout the present disclosure, the term "projection of the given image" refers to a collection of light rays emanating from a given image renderer when the given image is rendered thereat. The projection of the given image (namely, the collection of light rays) may transmit through and/or reflect from the optical element and various other components of the display apparatus before reaching the user's eye. For purposes of embodiments of the present disclosure, the term "projection of the given image" has been used consistently, irrespective of whether the collection of light rays is transmitted or reflected.

Optionally, the first image renderer and/or the second image renderer is implemented as a display. Optionally, the display is selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, and a Cathode Ray Tube (CRT)-based display.

Optionally, the first image renderer and/or the second image renderer is implemented as a projector and a projection screen associated therewith. Optionally, the projector is selected from the group consisting of: an LCD-based projector, an LED-based projector, an OLED-based projector, an LCoS-based projector, a Digital Light Processing (DLP)-based projector, and a laser projector.

Optionally, when the second image renderer is implemented as the projector and the projection screen, the display apparatus further comprises a third array of micro-prisms arranged in a proximity of a back surface of the projection screen, between the projector and the projection screen, wherein micro-prisms of the third array are arranged to make light rays emanating from the projector parallel. In operation, the projector projects the light towards the back surface of the projection screen. The light rays are made parallel upon passing through the micro-prisms of the third array. Such parallel light rays are then incident upon the back surface of the projection screen. Optionally, the projection screen is transparent to allow the parallel light rays to pass therethrough towards the first array of micro-prisms.

Optionally, the processor is configured to control the first image renderer and the second image renderer to render the first image and the second image substantially simultaneously, respectively. Notably, rendering the first and second images substantially simultaneously allows for producing the output image as a whole, in a manner that the user views the complete output image, rather than two separate images. By "substantially simultaneously", it is meant that a time instant of rendering the first image and a time instant of rendering the second image lie within 200 milliseconds of each other, and more optionally, within 20 milliseconds of each other.

Throughout the present disclosure, the term "first array of micro-prisms" refers to an optical component comprising a plurality of micro-sized prisms that allow for splitting a light beam into a given number of directions. Notably, optical properties and/or design of the micro-prisms of the first array allow for the light emanating from pixels of the second image renderer to undergo refraction upon entering and exiting the micro-prisms. As a result, said light is split into the plurality of directions to produce the plurality of projections of the second image.

The plurality of projections of the second image form a plurality of non-overlapping dim copies of the second image on an imaginary plane that is arranged on the optical path between the first array of micro-prisms and the optical element. When the light emanating from pixels of the second image renderer is split into the plurality of directions, an original intensity of such light is divided amongst the plurality of directions. As a result, the copies of the second image (that are formed by the plurality of projections of the second image) are dimmer as compared to the rendered second image.

It will be appreciated that an overall angular width of the plurality of non-overlapping dim copies of the second image on the imaginary plane is greater than an original angular width of the rendered second image. As an example, a given second image having horizontal and vertical angular widths equal to 30 degrees may be rendered via the second image renderer. The first array of micro-prisms may split light emanating from pixels of the second image renderer into 6 directions to produce 6 projections of the second image. Such 6 projections of the second image may form 6 non-overlapping dim copies of the second image on the imaginary plane, such 6 copies being arranged as a 2*3 grid on the imaginary plane. In such a case, the overall horizontal and vertical angular widths of the 6 non-overlapping dim copies would be equal to 90 degrees and 60 degrees (notably, thrice the horizontal angular width of the given second image and twice the vertical angular width of the given second image), respectively.

Optionally, an angle between two adjacent directions depends upon a distance between components of the display apparatus and a required field of view of the display apparatus.

In an embodiment, each micro-prism of the first array corresponds to one pixel of the second image renderer. In another embodiment, each micro-prism of the first array corresponds to a plurality of pixels of the second image renderer. Optionally, in such a case, the first array of micro-prisms comprises a single micro-prism that corresponds to an entirety of pixels of the second image renderer.

In an embodiment, the first array of micro-prisms is arranged at a given distance from the image rendering surface of the second image renderer. Such a given distance is selected to be such that there is minimal spreading of the light emanating from the second image renderer prior to entering the first array of micro-prisms. In another embodiment, the first array of micro-prisms is arranged upon the image rendering surface of the second image renderer.

Optionally, all micro-prisms of the first array are identical. In such a case, all micro-prisms of the first array have similar shape and size.

Optionally, a given micro-prism of the first array of micro-prisms has a wedge-like shape. In other words, the given micro-prism of the first array of micro-prisms has a plurality of faces, wherein the plurality of faces comprise at least one input face wherefrom light enters the given micro-prism and at least one output face wherefrom light exits the given micro-prism, a given input face and a given output face having a shallow angle (namely, an optical wedge) therebetween. It will be appreciated that a given face of the given micro-prism could be planar, curved, or freeform.

In an example, the given micro-prism may have 10 faces, wherein the 10 faces comprise 1 input face and 9 output faces. In such an example, the single input face may be arranged to face the at least one corresponding pixel of the second image renderer, while the remaining 9 output faces may be arranged to direct light emanating from the at least one corresponding pixel into 9 directions.

In another example, the given micro-prism may have 5 faces, wherein the 5 faces comprise 1 input face and four output faces. In such an example, the single input face may be arranged to face the at least one corresponding pixel of the second image renderer, while the remaining 4 faces may be arranged to direct light emanating from the at least one corresponding pixel into 4 directions.

Optionally, a number of directions in the plurality of directions is fixed. Optionally, in this regard, the number of directions in the plurality of directions is less than or equal to a number of output faces of the given micro-prism of the first array. It will be appreciated that the number of directions in the plurality of directions depends upon the shape of the given micro-prism of the first array. Notably, said number of directions is less than or equal to a number of output faces of the given micro-prism of the first array. The shape of the given micro-prism of the first array depends upon the required field of view of the display apparatus, and is defined by the arrangement of its plurality of faces with respect to each other.

Optionally, the number of directions in the plurality of directions is greater than or equal to 2. The number of directions may, for example, be 2, 3, 4, 5, 6, 7, 8, 9, 10, 11, 12, 13, 14, 15, or 16 directions.

It will be appreciated that greater the number of directions in the plurality of directions, lesser is the intensity of light that gets directed towards a single direction. As a result, lesser is the intensity of a given copy of the image that is formed on the imaginary plane by a given projection of the second image. Consequently, lesser is the intensity of a given region of the output image corresponding to the second image.

As an example, when an intensity of a given pixel of the second image renderer is X, and light emanating from the given pixel is split into 4 directions by a given micro-prism of the first array, an intensity of the given pixel in each of the 4 dim copies of the second image would be 0.25*X. Alternatively, if the light emanating from the given pixel was split into 9 directions by a given micro-prism of the first array, an intensity of the given pixel in each of the 9 dim copies of the second image would be 0.11*X.

Optionally, the first array of micro-prisms is static. In other words, the first array of micro-prisms is immovable. In such a case, an arrangement of the first array of micro-prisms with respect to the second image renderer is fixed. As a result, the plurality of directions into which the light emanating from the pixels of the second image renderer is split are also fixed. It will be appreciated that the static first array of micro-prisms allows for simplifying an arrangement of components within the display apparatus.

Alternatively, optionally, the first array of micro-prisms is controllable. In such a case, the processor is configured to control the first array of micro-prisms to split the light emanating from the second image renderer into specific directions. When the first array of micro-prisms is controllable, the number of directions in the plurality of directions may be fixed or dynamic.

In an embodiment, the first array of micro-prisms is controllable via deformation. In such a case, the micro-prisms of the first array are made using an active polymer or a flexible membrane material. When the processor applies a drive signal (for example, such as a voltage signal) to micro-prisms made using such materials, the micro-prisms of the first array undergo deformation (for example, such as an increase or decrease in the number of faces of the micro-prisms of the first array, a change in angle(s) between existing faces of the micro-prisms of the first array, and the like). It will be appreciated that an extent of such deformation is related to a magnitude of the drive signal.

As an example, the processor may apply the drive signal to increase the number of faces of the micro-prisms of the first array. In such a case, the number of directions in the plurality of directions would increase. As another example, the processor may apply the drive signal to change the angle(s) between existing faces of the micro-prisms of the first array. In such a case, the number of directions in the plurality of directions would remain unchanged.

In another embodiment, the first array of micro-prisms is controllable via tilting. In such a case, the display apparatus further comprises at least one actuator for tilting the first array of micro-prisms, wherein the processor is configured to control the at least one actuator to tilt the micro-prisms to a required position with respect to the second image renderer. Throughout the present disclosure, the term "actuator" refers to equipment (for example, such as electrical components, mechanical components, magnetic components, polymeric components, and so forth) that is employed to adjust position and/or orientation of a given component of the display apparatus. In said embodiment, the at least one actuator is employed to adjust position and/or orientation of the first array of micro-prisms. Notably, the at least one actuator is driven by an actuation signal. It will be appreciated that the actuation signal could be a mechanical torque, an electric current, a hydraulic pressure, a pneumatic pressure, and the like.

Yet alternatively, optionally, the first array of micro-prisms is exchangeable, via mechanical switching. In such a case, the display apparatus further comprises at least one actuator for exchanging the first array of micro-prisms with a given array of micro-prisms, wherein the micro-prisms of the given array split light emanating from pixels of the second image renderer into a plurality of directions that are different from the plurality of directions associated with the first array of micro-prisms, and wherein the processor is configured to control the at least one actuator to mechanically switch the first array of micro-prisms with the given array of micro-prisms. Optionally, at least the first array of micro-prisms and the given array of micro-prisms are arranged on a View-Master® reel. It will be appreciated that the View-Master® reel could include a plurality of arrays of micro-prisms arranged thereon. As an example, the View-Master® reel could include 2, 3, 4, 5, 6, 7, 8, 9, or 10 arrays of micro-prisms thereon.

Throughout the present disclosure, the term "optical element" refers to an optical component that is capable of adjusting an optical path of light. The optical element is employed to direct (for example, via reflection, refraction, and the like) the plurality of projections of the second image towards the optical combiner. In particular, the optical element is employed to direct the plurality of projections of the second image towards the optical combiner in a manner that the plurality of projections of the second image are substantially parallel.

In an embodiment, the optical element is implemented by way of a second array of micro-prisms. Throughout the present disclosure, the term "second array of micro-prisms" refers to an optical component comprising a plurality of micro-sized prisms that allow for making the plurality of projections of the second image substantially parallel to each other, while directing the plurality of projections of the second image towards the optical combiner. The micro-prisms of the second array can be understood to be "receiving micro prisms" since they receive the plurality of projections of the second image from the first array of micro-prisms and make such plurality of projections of the second image substantially parallel to each other.

In another embodiment, the optical element is implemented by way of an optical waveguide.

Throughout the present disclosure, the term "optical shutter" refers to a device that, when controlled, either allows or prevents transmission of light therethrough. Therefore, when arranged on the optical path between the optical element and the optical combiner, the optical shutter selectively allows only the given portion of the plurality of projections of the second image to pass through towards the optical combiner, whilst blocking the remaining portion of the plurality of projections of the second image.

Optionally, the optical shutter is implemented by way of a spatial light modulator. Optionally, in this regard, the spatial light modulator is an electrically addressable spatial light modulator. Notably, the processor is configured to control the spatial light modulator by way of an electrical control signal, to allow or block passage of light through the spatial light modulator. Examples of the spatial light modulator include, but are not limited to, a Digital Micromirror Device®, a Liquid Crystal on Silicon (LCoS)-based display, a Ferroelectric Liquid Crystal on Silicon (FLCoS)-based display, and a nematic liquid crystal-based display.

Alternatively, optionally, the optical shutter is implemented by way of a Liquid Crystal (LC) shutter matrix. The LC shutter matrix comprises a plurality of LCDs which are controllable to toggle between an open state and a closed state by application of a control signal. In the open state, a given LCD is transparent and allows light to pass therethrough. Alternatively, in the closed state, the given LCD is opaque and blocks light from passing therethrough. It will be appreciated that sizes of the plurality of LCDs in the LC shutter matrix are to be selected such that the smallest addressable portion of the plurality of projections of the second image is incident upon a single LCD. As an example, each LCD in the LC shutter matrix has dimensions that are suitable to receive light rays emanating from only a single pixel of the second image renderer. This allows for greater control in selectively allowing only the given portion of the plurality of projections of the second image to pass through the optical shutter.

The processor controls the optical shutter based upon the detected gaze direction, whilst the first image and the second image are being rendered. In particular, the optical shutter is controlled to allow only that given portion of the plurality of projections of the second image to pass through which would be incident upon a region of the image plane at which the user's gaze is focused. The given portion of the plurality of projections of the second image would produce a specific region of the output image.

It will be appreciated that in some implementations, the given portion of the plurality of projections of the second image corresponds to a single projection of the second image, whereas in other implementations, the given portion of the plurality of projections of the second image corresponds to portions of at least two projections of the second image.

Optionally, controlling the optical shutter and rendering the second image are performed substantially simultaneously. Here, by "substantially simultaneously", it is meant that a time instant of controlling the optical shutter to allow passage of the given portion of the plurality of projections of the second image and the time instant of rendering the second image lie within a range of a few microseconds to a few milliseconds of each other.

Throughout the present disclosure, the term "optical combiner" refers to equipment (for example, such as optical components) for optically combining the projection of the first image with the given portion of the plurality of projections of the second image. In operation, the at least one optical combiner optically combines the projection of the first image with the given portion of the plurality of projections to constitute a combined projection, wherein the combined projection is a projection of the output image.

Throughout the present disclosure, the term "output image" refers to an image that is produced on the image plane, and is visible to the user. Notably, the output image has the spatially-variable angular resolution. By "spatially-variable angular resolution", it is meant that angular resolution of the output image varies spatially across the image plane. Throughout the present disclosure, the term "angular resolution" refers to the number of pixels per degree (namely, points per degree (PPD)) of an angular width of a given region of the output image, from a perspective of the user's eyes. It will be appreciated that in order to achieve the spatially-variable angular resolution of the output image, optionally, the image resolution of the second image is greater than the image resolution of the first image.

Optionally, the output image comprises at least a first region and a second region, wherein an angular resolution of the second region of the output image is greater than an angular resolution of the first region of the output image. Beneficially, the angular resolution of the second region of the output image is comparable to a normal human-eye resolution. Therefore, the output image having the spatially-variable angular resolution mimics foveation characteristics of the human visual system. In such a case, the display apparatus emulates foveation characteristics of the human visual system.

Optionally, the angular resolution of the second region of the output image is greater than or equal to twice the angular resolution of the first region of the output image. More optionally, the angular resolution of the second region of the output image is greater than or equal to six times the angular resolution of the first region of the output image. It will be appreciated that when the user views the output image, the second region of the output image appears to have more visual detail with respect to a remaining region (namely, the first region) of the output image. As an example, the angular resolution of the second region of the output image may be approximately 90 pixels per degree, while the angular resolution of the first region of the output image may be approximately 15 pixels per degree.

Optionally, the second region of the output image corresponds to the region of interest of the input image whereas the first region of the output image corresponds to a remaining region of the input image. In other words, optionally, the second region of the output image corresponds to the second image whereas the first region of the output image corresponds to the first image excluding a region of the first image that corresponds to the second image. Notably, the given portion of the plurality of projections of the second image produces the second region of the output image whereas the projection of the masked region of the first image produces the first region of the output image at the image plane.

Optionally, the second region of the output image is produced upon the region of the image plane whereat the user's gaze is focused, whereas the first region of the output image is produced upon a remaining region of the image plane.

Optionally, the at least one optical combiner is implemented by way of at least one of: a lens, a mirror, a semi-transparent mirror, a semi-transparent film, a semi-transparent flexible membrane, a prism, a beam splitter, an optical waveguide, a polarizer.

Optionally, the processor is configured to:
  detect whether or not the gaze direction of the user corresponds exactly to a region of the image plane whereat any one of the plurality of projections of the second image would be incident;
  render the second image via the second image renderer, when the gaze direction of the user corresponds exactly to said region; and further process the second image prior to rendering, when the gaze direction of the user does not correspond exactly to said region.

In this regard, when the gaze direction of the user corresponds exactly to the region of the image plane whereat any one of the plurality of projections of the second image would be incident, the given portion of the plurality of projections of the second image corresponds to a given projection of the second image among the plurality of projections of the second image. Notably, said given projection of the second image comprises an entirety of pixel data of the second image from the second image renderer to the image plane, in exact form. As a result, at the image plane, the second region of the output image would be produced exactly as the second image that was rendered at the second image renderer. Therefore, in such a case, the second image does not require any further processing prior to rendering.

Furthermore, when gaze direction of the user does not correspond exactly to the region of the image plane whereat any one of the plurality of projections of the second image would be incident, the given portion of the plurality of projections of the second image corresponds to portions of the at least two projections of the second image. In such a case, the given portion of the plurality of projections of the second image carries an entirety of pixel data of the second image from the second image renderer to the image plane, in a jumbled (namely, disordered) form. As a result, at the image plane, the second region of the output image would be produced in a muddled-up form that is different from the way the second image was rendered at the second image renderer. Therefore, in such a case, the second image requires further processing prior to rendering, in order for the second region of the output image to be viewable in a required form. Such processing is described in more detail herein below.

Optionally, when further processing the second image, the processor is configured to:
  divide the second image into two portions when the gaze direction corresponds to a region of the image plane whereat two of the plurality of projections of the second image would be incident, and swap positions of the two portions; or
  divide the second image into four portions when the gaze direction of the user corresponds to a region of the image plane whereat four of the plurality of projections of the second image would be incident, and diagonally swap positions of the four portions.

When the gaze direction corresponds to a region of the image plane whereat two of the plurality of projections of the second image would be incident, the given portion (of the plurality of projections of the second image) comprises different portions of said two projections of the second image. Said different portions of the two projections of the second image comprise pixel data of the second image in a rearranged (namely, shuffled) form. Notably, pixel data of a given portion of the second image is swapped with pixel data of a remaining portion of the second image. As a result, at the image plane, the second region of the output image would be produced in a disarranged form that is different from the way the second image was rendered at the second image renderer.

Therefore, prior to rendering, the second image is divided into two portions corresponding to the different portions of the two projections of the second image, and the positions of such two portions of the second image are swapped in order to correctly produce the second region of the output image. Such a manner of processing the second image prior to rendering allows for the use of the different portions of the two projections of the second image to produce the second region of the output image.

Alternatively, when the gaze direction corresponds to a region of the image plane whereat four of the plurality of projections of the second image would be incident, the given portion (of the plurality of projections of the second image) comprises different portions of said four projections of the second image. Said different portions of the four projections of the second image comprise pixel data of the second image in a rearranged (namely, shuffled) form. Notably, pixel data of a given portion of the second image is swapped with pixel data of another portion of the second image that is arranged diagonally with respect to said given portion. As a result, at the image plane, the second region of the output image would be produced in a disarranged form that is different from the way the second image was rendered at the second image renderer. Therefore, prior to rendering, the second image is divided into four portions corresponding to the different portions of the four projections of the second image, and the positions of such four portions of the second image are diagonally swapped in order to correctly produce the second region of the output image. Such a manner of processing the second image prior to rendering allows for the use of the different portions of the four projections of the second image to produce the second region of the output image.

Optionally, the display apparatus further comprises a collimator arranged between the second image renderer and the first array of micro-prisms. Such a collimator allows for minimal spreading of the light emanating from the second image renderer as such light travels from the second image renderer towards the first array of micro-prisms.

Optionally, the collimator comprises an array of nanotubes, wherein each nanotube of the array collimates light emanating from a single pixel of the second image renderer. Additionally, optionally, each pixel of the second image renderer corresponds to a plurality of nanotubes of the array. In such a case, light emanating from a given pixel is collimated by its corresponding nanotubes. As an example, a given pixel of the second image renderer corresponds to 13 nanotubes of the array. Each of said 13 nanotubes collimate light from only the given pixel of the second image renderer. It will be appreciated that the array of nanotubes can be fabricated as a compact optical component, which can be easily used in the display apparatus without adding much complexity to an arrangement of components within the display apparatus.

Optionally, the display apparatus further comprises a condenser lens per face of a given micro-prism of the first array of micro-prisms, wherein a given condenser lens is arranged over a given face of the given micro-prism to converge a divergent light beam emerging from the given face into a convergent light beam.

In other words, the given condenser lens focuses the divergent light beam emerging from the given face into the convergent light beam. It will be appreciated that such converging property of the condenser lens allows for reducing spherical aberration within the display apparatus.

Moreover, the present disclosure also relates to the method as described above. Various embodiments and variants disclosed above, with respect to the aforementioned first aspect, apply mutatis mutandis to the method.

Optionally, the display apparatus further comprises a condenser lens per face of a given micro-prism of the first array of micro-prisms, and wherein the method comprises converging, via a given condenser lens arranged over a given face of the given micro-prism, a divergent light beam emerging from the given face into a convergent light beam.

Optionally, the method further comprises:
- detecting whether or not the gaze direction of the user corresponds exactly to a region of the image plane whereat any one of the plurality of projections of the second image would be incident;
- rendering the second image via the second image renderer, when the gaze direction of the user corresponds exactly to said region; and
- further processing the second image prior to rendering, when the gaze direction of the user does not correspond exactly to said region.

Optionally, when further processing the second image, the method comprises:
- dividing the second image into two portions when the gaze direction corresponds to a region of the image plane whereat two of the plurality of projections of the second image would be incident, and swapping positions of the two portions; or
- dividing the second image into four portions when the gaze direction of the user corresponds to a region of the image plane whereat four of the plurality of projections of the second image would be incident, and diagonally swapping positions of the four portions.

DETAILED DESCRIPTION OF THE DRAWINGS

Referring to FIG. 1, illustrated is a block diagram of architecture of a display apparatus 100, in accordance with an embodiment of the present disclosure. The display apparatus 100 comprises means 102 for detecting a gaze direction of a user with respect to an image plane, a processor 104, a first image renderer per eye (depicted as a first image renderer 106, for sake of simplicity), a second image renderer per eye (depicted as a second image renderer 108, for sake of simplicity), an optical combiner 110, a first array 112 of micro-prisms, an optical element 114, and an optical shutter 116.

The processor 104 is coupled to the means 102, wherein the processor 104 or an image source 118 communicably coupled to the processor 104 is configured to process an input image, based upon the detected gaze direction, to generate a first image and a second image. The first image renderer 106 and the second image renderer 108 are employed to render the first image and the second image, respectively.

The first array 112 of micro-prisms is arranged in a proximity of an image rendering surface of the second image renderer 108. The micro-prisms of the first array 112 split light emanating from pixels of the second image renderer 108 into a plurality of directions to produce a plurality of projections of the second image, wherein each micro-prism of the first array 112 splits light emanating from at least one corresponding pixel into said plurality of directions. Furthermore, the optical element 114 is arranged on an optical path between the first array 112 of micro-prisms and the optical combiner 110, the optical element 114 being employed to direct the plurality of projections of the second image towards the optical combiner 110.

The optical shutter 116 is arranged on said optical path, between the optical element 114 and the optical combiner 110. The optical shutter 116 selectively allows a given portion of the plurality of projections of the second image to pass through towards the optical combiner 110, whilst blocking a remaining portion of the plurality of projections of the second image. The processor 104 controls the optical shutter 116 based upon the detected gaze direction, whilst the first image and the second image are being rendered. The optical combiner 110 optically combines a projection of the first image with the given portion of the plurality of projections of the second image, to produce on the image plane an output image having a spatially-variable angular resolution.

FIG. 1 is merely an example, which should not unduly limit the scope of the claims herein. It is to be understood that the specific designation for the display apparatus 100 is provided as an example and is not to be construed as limiting the display apparatus 100 to specific numbers or types of means for detecting the gaze direction, processors, image renderers, optical combiners, arrays of micro-prisms, optical elements, and optical shutters. A person skilled in the art will recognize many variations, alternatives, and modifications of embodiments of the present disclosure.

Figure 2:
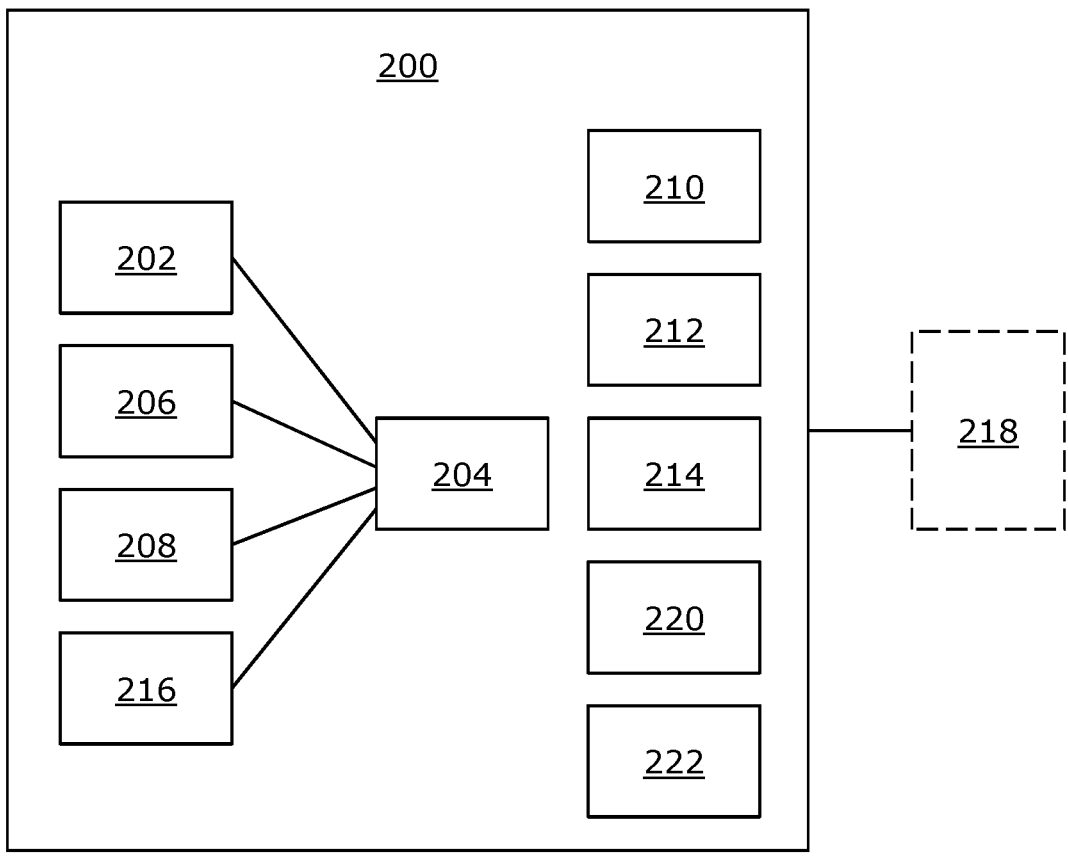

Referring to FIG. 2, illustrated is a block diagram of architecture of a display apparatus 200, in accordance with another embodiment of the present disclosure. The display apparatus 200 comprises means 202 for detecting a gaze direction of a user with respect to an image plane, a processor 204, a first image renderer per eye (depicted as a first image renderer 206, for sake of simplicity), a second image renderer per eye (depicted as a second image renderer 208, for sake of simplicity), an optical combiner 210, a first array 212 of micro-prisms, an optical element 214, and an optical shutter 216.

The processor 204 is coupled to the means 202, wherein the processor 204 or an image source 218 communicably coupled to the processor 204 is configured to process an input image, based upon the detected gaze direction, to generate a first image and a second image.

The display apparatus 200 further comprises a collimator 220 arranged between the second image renderer 208 and the first array 212 of micro-prisms. The display apparatus 200 further comprises a condenser lens per face (depicted as a condenser lens 222, for sake of simplicity) of a given micro-prism of the first array 212 of micro-prisms, wherein a given condenser lens is arranged over a given face of the given micro-prism to converge a divergent light beam emerging from the given face into a convergent light beam.

FIG. 2 is merely an example, which should not unduly limit the scope of the claims herein. It is to be understood that the specific designation for the display apparatus 200 is provided as an example and is not to be construed as limiting the display apparatus 200 to specific numbers or types of means for detecting the gaze direction, processors, image renderers, optical combiners, arrays of micro-prisms, optical elements, optical shutters, collimators and condenser lenses. A person skilled in the art will recognize many variations, alternatives, and modifications of embodiments of the present disclosure.

Figure 3:
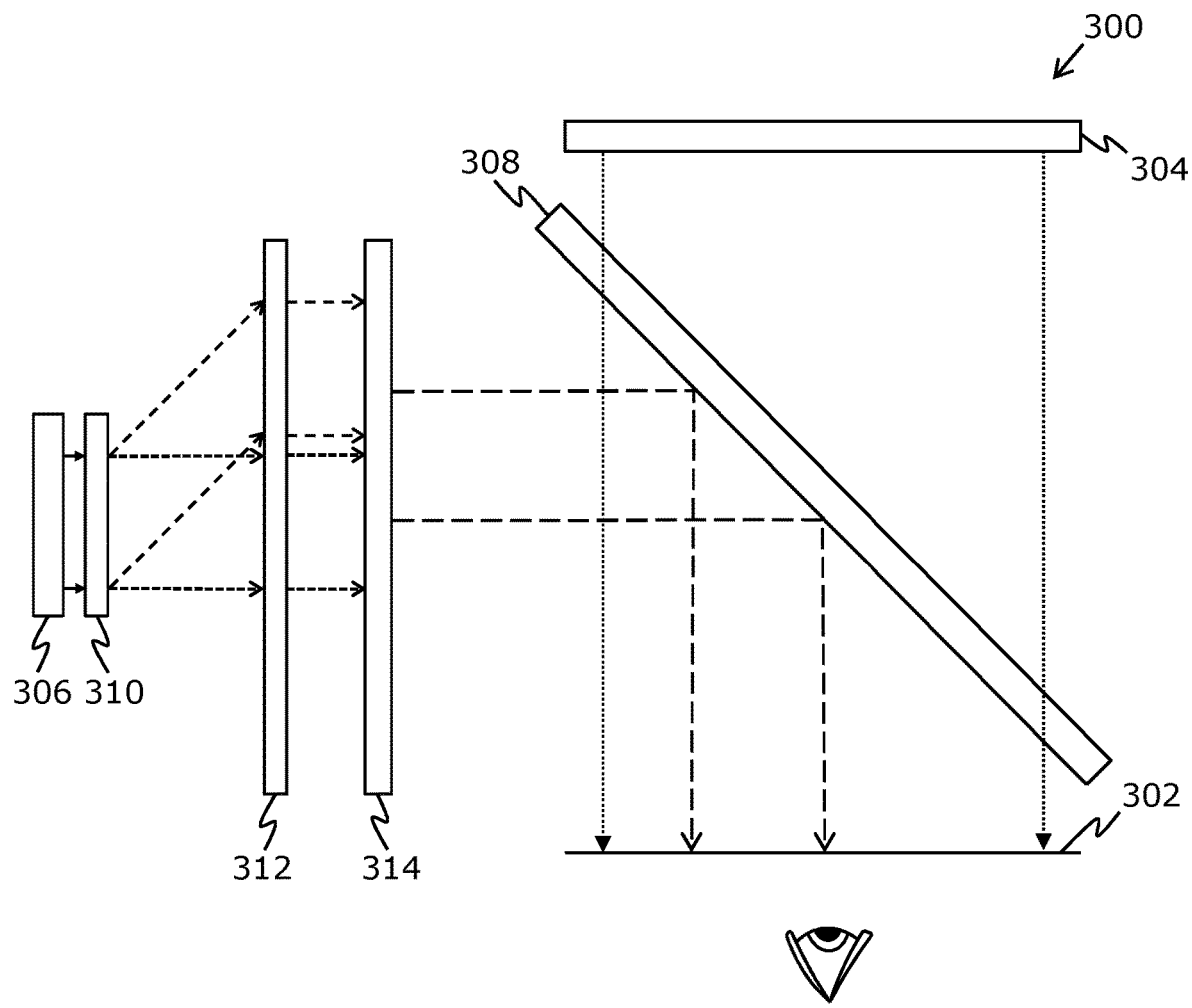
FIG. 3 is a schematic illustration of an exemplary implementation of a display apparatus, in accordance with an embodiment of the present disclosure.

Referring to FIG. 3, illustrated is a schematic illustration of an exemplary implementation of a display apparatus 300, in accordance with an embodiment of the present disclosure. The display apparatus 300 comprises means (not shown) for detecting a gaze direction of a user with respect to an image plane 302, a processor (not shown), a first image renderer 304, a second image renderer 306, an optical combiner 308, a first array 310 of micro-prisms, an optical element 312, and an optical shutter 314. The first array 310 of micro-prisms is arranged in a proximity of an image rendering surface of the second image renderer 306. The optical element 312 is arranged on an optical path between the first array 310 of micro-prisms and the optical combiner 308. The optical shutter 314 is arranged on said optical path, between the optical element 312 and the optical combiner 308.

The processor is coupled to said means for detecting gaze direction.

The processor or an image source (not shown) communicably coupled to the processor is configured to process an input image, based upon the detected gaze direction, to generate a first image and a second image. The first image renderer 304 is employed to render the first image and the second image renderer 306 is employed to render the second image.

The micro-prisms of the first array 310 split light (depicted as a pair of solid arrows) emanating from pixels of the second image renderer 306 into two directions to produce two projections of the second image. The two projections of the second image are depicted as a pair of small-dashed arrows, and a pair of medium-dashed arrows. Notably, each micro-prism of the first array 310 splits light emanating from at least one corresponding pixel into the two directions.

The optical element 312 is employed to direct the two projections of the second image towards the optical combiner 308. The optical shutter 314 selectively allows a given portion of the two projections of the second image to pass through towards the optical combiner 308, whilst blocking a remaining portion of the plurality of projections of the second image. The given portion of the two projections of the second image is depicted by a pair of long-dashed arrows. The processor controls the optical shutter 314 based upon the detected gaze direction, whilst the first image and the second image are being rendered. The optical combiner 308 optically combines a projection of the first image (depicted as a pair of dotted arrows) with the given portion of the plurality of projections of the second image, to produce on the image plane 302 an output image having a spatially-variable angular resolution.

FIG. 3 is merely an example, which should not unduly limit the scope of the claims herein. It is to be understood that the specific designation for the display apparatus 300 is provided as an example and is not to be construed as limiting the display apparatus 300 to specific numbers of components or types of components. For example, the micro-prisms of the first array may split light emanating from pixels of the second image renderer into four directions to produce four projections of the second image. A person skilled in the art will recognize many variations, alternatives, and modifications of embodiments of the present disclosure.

Figure 4:
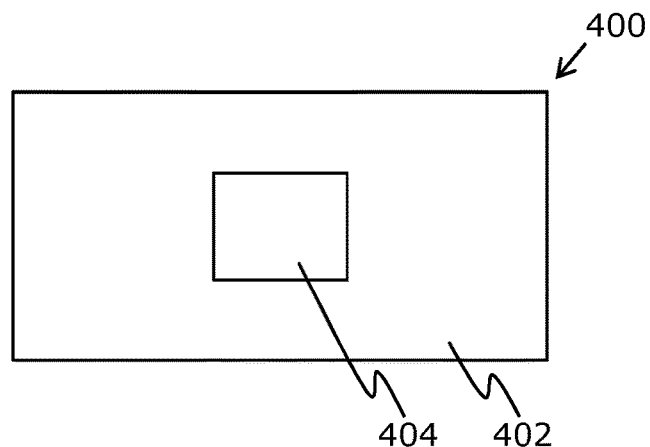
FIG. 4 is a schematic illustration of an output image that is produced on an image plane, in accordance with an embodiment of the present disclosure.

Referring to FIG. 4, illustrated is a schematic illustration of an output image 400 that is produced on an image plane, in accordance with an embodiment of the present disclosure. The output image 400 has a spatially-variable angular resolution. Notably, angular resolution of a first region 402 of the output image 400 is different from angular resolution of a second region 404 of the output image 404. As an example, the angular resolution of the first region 402 is lesser than the angular resolution of the second region 404.

FIG. 4 is merely an example, which should not unduly limit the scope of the claims herein. It is to be understood that the specific illustration for the output image 400 is provided as an example and is not to be construed as limiting the output image 400 or its regions 402 and 404 to specific shapes and/or sizes. A person skilled in the art will recognize many variations, alternatives, and modifications of embodiments of the present disclosure.

Figure 5A:
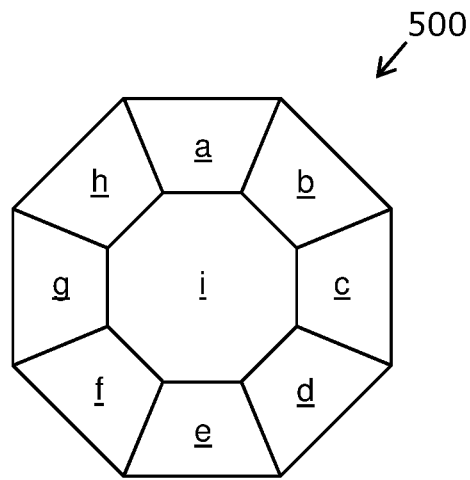
Figure 5B:
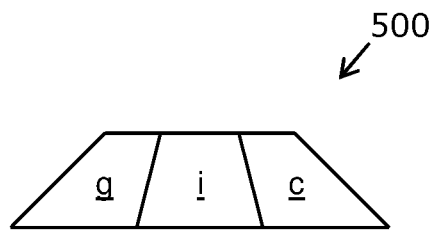
Figure 5C:
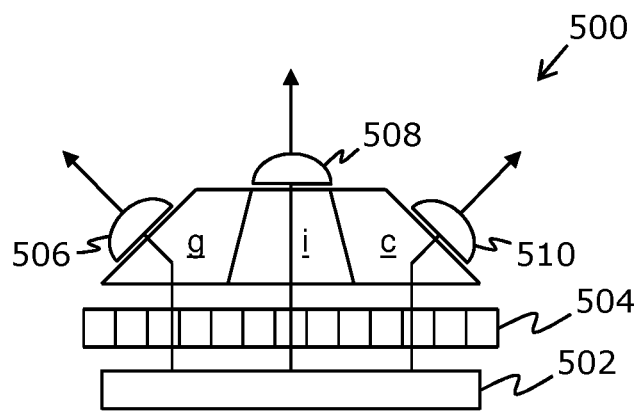
FIG. 5C illustrates how different faces of the given micro-prism split light from a corresponding pixel into a plurality of directions, in accordance with an embodiment of the present disclosure.

Referring to FIGS. 5A and 5B illustrated are front and side views of a given micro-prism 500 of a first array of micro-prisms, respectively, while FIG. 5C illustrates how different faces of the given micro-prism 500 split light from a corresponding pixel 502 into a plurality of directions, in accordance with an embodiment of the present disclosure.

The given micro-prism 500 of the first array of micro-prisms has a wedge-like shape. The given micro-prism 500 has a plurality of faces (for example, such as 10 faces that comprise 1 input face and 9 output faces) to split light from the corresponding pixel into a plurality of directions.

In FIG. 5A, the given micro-prism 500 is shown to depict its nine output faces a, b, c, d, e, f, g, h, and i. In FIG. 5B, there are depicted 3 output faces c, g and i of the given micro-prism 300.

In FIG. 5C, the output faces c, g and and i are shown to refract light from the corresponding pixel 502 (of a second image renderer) into 3 different directions. There is also shown a collimator 504 arranged between the second image renderer and the first array of micro-prisms. The collimator 504 comprises an array of nanotubes, wherein each nanotube of the array collimates light emanating from a single pixel of the second image renderer. Furthermore, each pixel of the second image renderer corresponds to a plurality of nanotubes of the array. As shown, the pixel 502 corresponds to 13 nanotubes, and light emanating from the pixel 502 is collimated by its corresponding nanotubes.

In FIG. 5C, there are also shown condenser lenses 506, 508, and 510 corresponding to faces g, i, and c of the given micro-prism 500, respectively. A given condenser lens is arranged over a given face of the given micro-prism 500 to converge a divergent light beam emerging from the given face into a convergent light beam.

FIGS. 5A, 5B and 5C are merely examples, which should not unduly limit the scope of the claims herein. It is to be understood that the specific illustration for the given micro-prism 500 is provided as an example and is not to be construed as limiting the given micro-prism 500, the collimator 504, and the condenser lenses 506, 508, and 510 to specific numbers, shapes or types. For example, the given micro-prism may have a different number of faces. A person skilled in the art will recognize many variations, alternatives, and modifications of embodiments of the present disclosure.

Figure 6:
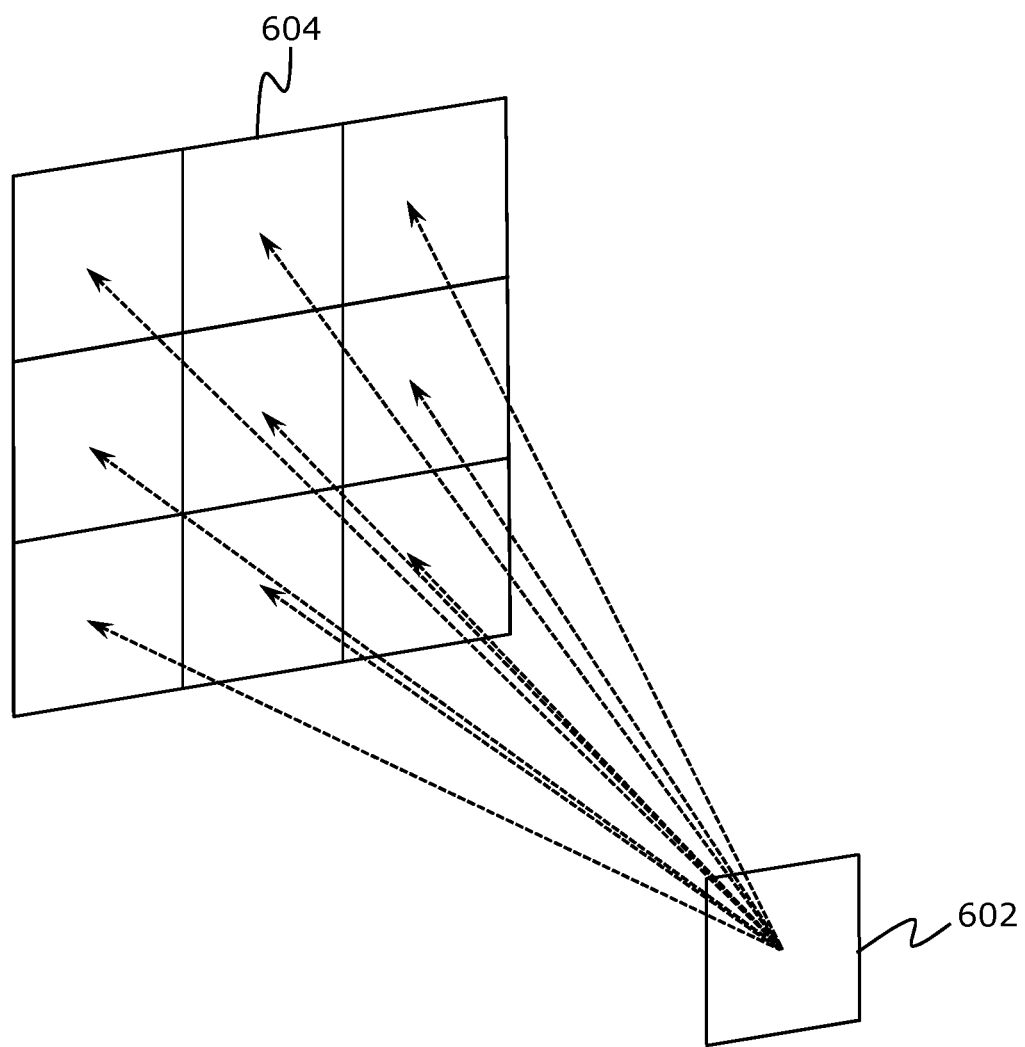
FIG. 6 is a schematic illustration of how light emanating from a second image renderer is split into a plurality of directions to produce a plurality of projections of a second image, in accordance with an embodiment of the present disclosure.

Referring to FIG. 6, illustrated is a schematic illustration of how light emanating from a second image renderer 602 is split into a plurality of directions to produce a plurality of projections of a second image, in accordance with an embodiment of the present disclosure. Notably, a first array of micro-prisms (not shown) is arranged in a proximity of an image rendering surface of the second image renderer 602 to split the light emanating from pixels of the second image renderer 602 into the plurality of directions. As a result, each projection among the plurality of projections of the second image is incident on a different non-overlapping region of an imaginary plane 604 that is arranged between the first array of micro-prisms and an optical element. The light emanating from the second image renderer 602 is shown to be split into 9 directions to produce 9 projections of the second image (depicted by way of dashed arrows). Such 9 projections of the second image would form 9 copies of the second image upon being incident on the imaginary plane 604.

FIG. 6 is merely an example, which should not unduly limit the scope of the claims herein. A person skilled in the art will recognize many variations, alternatives, and modifications of embodiments of the present disclosure. For example, light emanating from the second image renderer may be split into 4 directions to produce 4 projections of the second image.

Figure 7A:
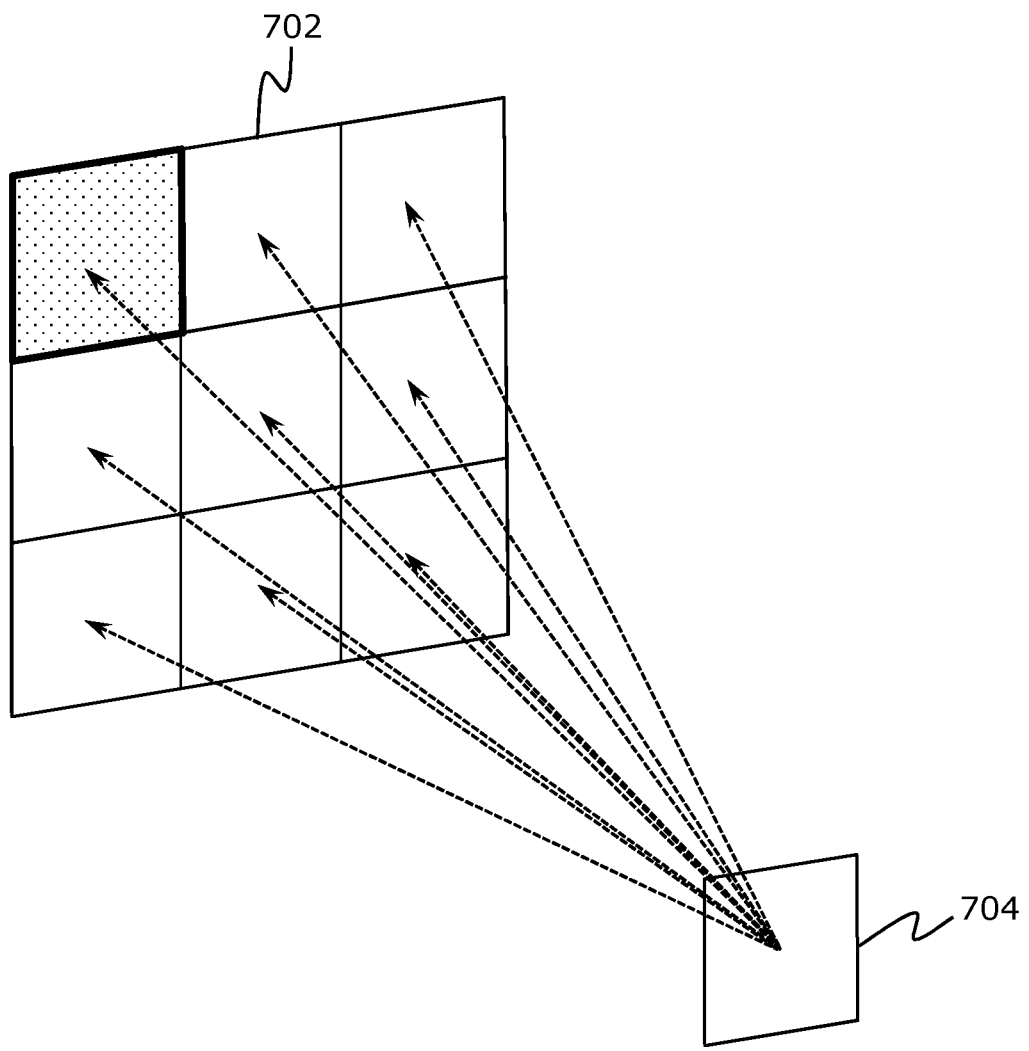
FIG. 7A illustrates an example scenario where gaze direction of a user corresponds exactly to a region of an image plane whereat any one of the plurality of projections of the second image would be incident.
Figure 7B:
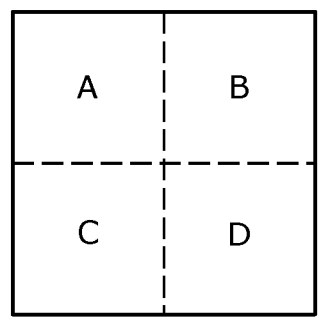
FIG. 7B illustrates a given region of the output image.
Figure 7C:
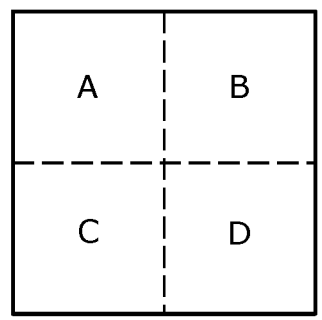
Figure 7D:
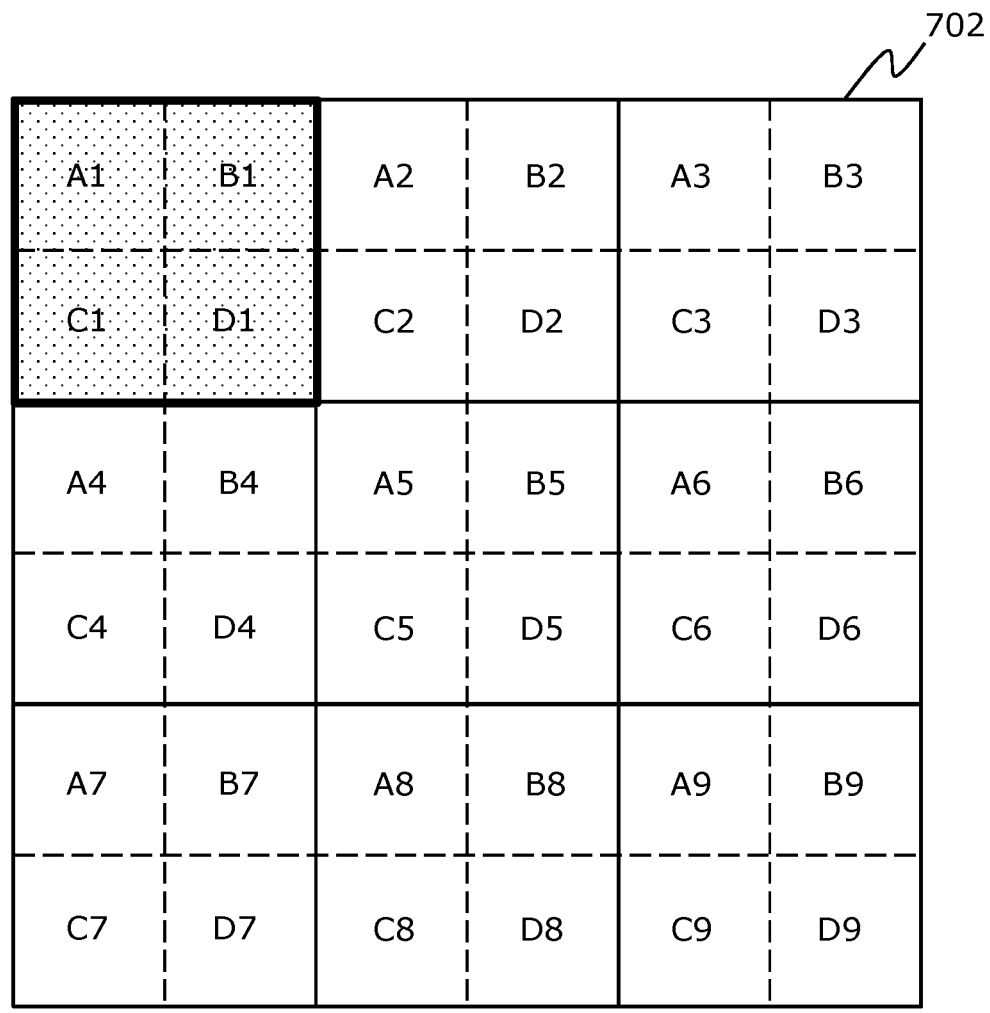
FIG. 7D illustrates an imaginary plane depicting a plurality of copies of the rendered second image, in accordance with an embodiment of the present disclosure.

Referring to FIG. 7A, illustrated is an example scenario where gaze direction of a user corresponds exactly to a region of an image plane (not shown) whereat any one of a plurality of projections of a second image would be incident, FIG. 7B illustrates a given region of an output image, FIG. 7C illustrates the second image to be rendered, while FIG. 7D illustrates an imaginary plane 702 depicting a plurality of copies of the rendered second image, in accordance with an embodiment of the present disclosure.

In FIG. 7A, light emanating from a second image renderer 704 is shown to be split into 9 directions to produce 9 projections of the second image. Such 9 projections of the second image form 9 non-overlapping copies of the second image upon being incident on the imaginary plane 702, the imaginary plane 702 being arranged between a first array of micro-prisms and an optical element. Notably, a hatched region of the imaginary plane 702 corresponds to the region of the image plane whereat the gaze direction of the user is focused.

In FIG. 7B, the given region of the output image is shown to comprise four equal sized portions A, B, C, and D.

In FIG. 7C, the second image to be rendered is also shown to comprise four equal sized portions A, B, C, and D. Since the gaze direction of the user corresponds exactly to the region of the image plane whereat any one of the plurality of projections of the second image would be incident, the second image can be rendered without further processing to produce the given region of the output image.

In FIG. 7D, the imaginary plane 702 depicts 9 copies of the rendered second image. An entire copy of the second image lies within the hatched region of the imaginary plane 702. The projection of the second image corresponding to said copy of the second image produces the given region of the output image at the image plane.

FIGS. 7A, 7B, 7C and 7D merely illustrate one example scenario, which should not unduly limit the scope of the claims herein. A person skilled in the art will recognize many variations, alternatives, and modifications of embodiments of the present disclosure. For example, light emanating from the second image renderer 704 may be split into 4 directions to produce 4 projections of the second image.

Figure 8A:
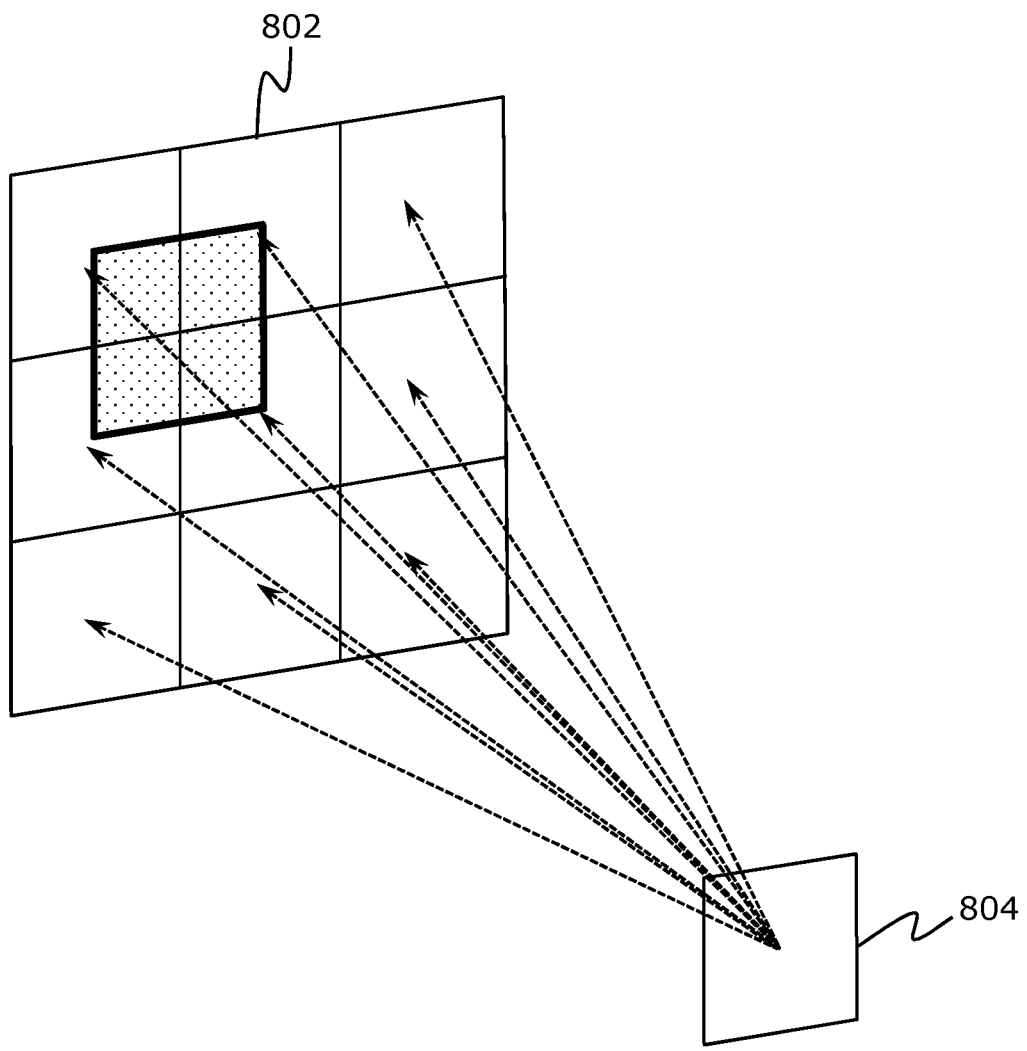
FIG. 8A illustrates another example scenario where gaze direction of a user corresponds to a region of an image plane whereat four of the plurality of projections of the second image would be incident.
Figure 8B:
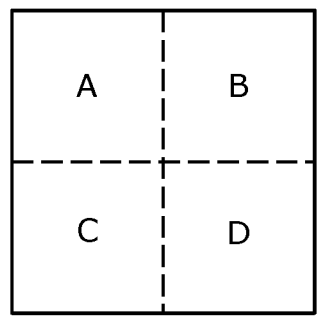
FIG. 8B illustrates a given region of the output image.
Figure 8C:
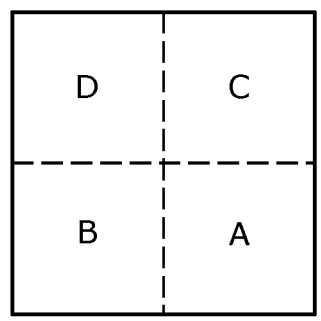
Figure 8D:
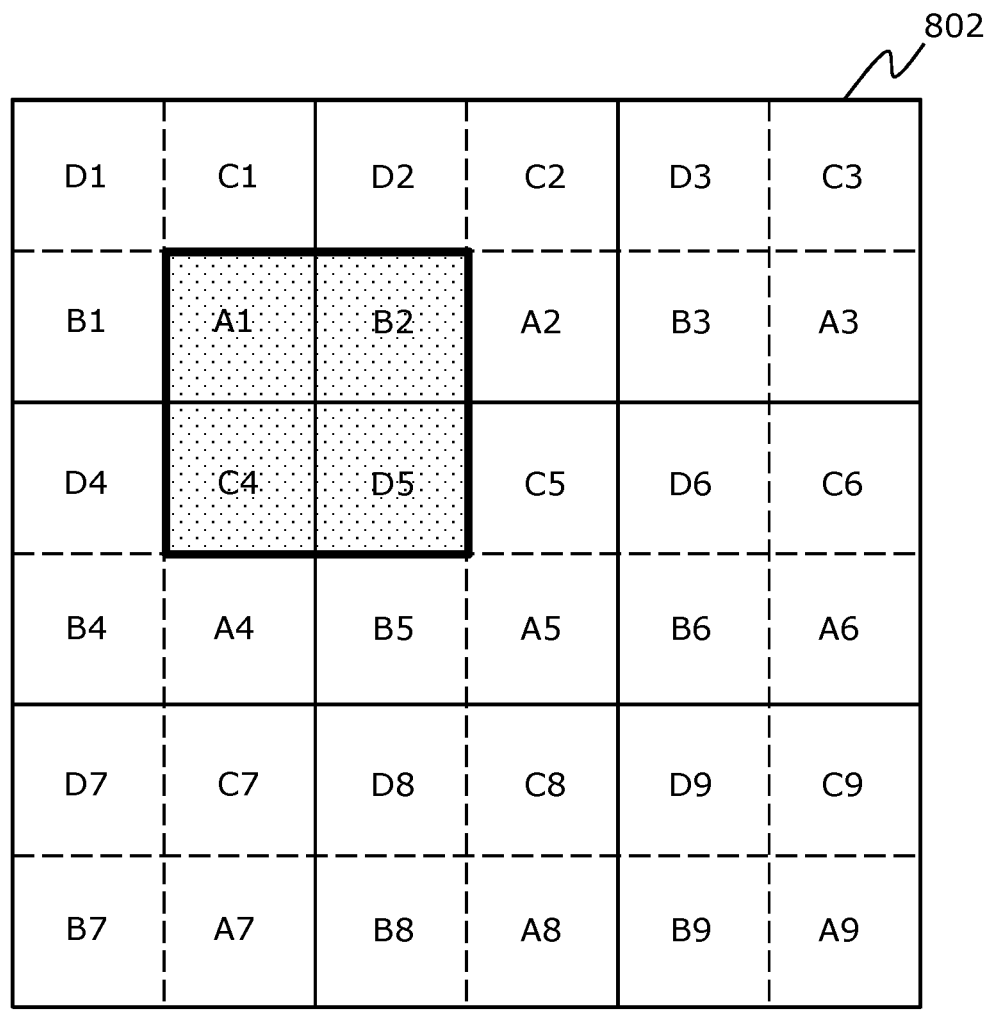
FIG. 8D illustrates an imaginary plane depicting a plurality of copies of the rendered second image, in accordance with an embodiment of the present disclosure.

Referring to FIG. 8A, illustrated is another example scenario where gaze direction of a user corresponds to a region of an image plane whereat four of a plurality of projections of a second image would be incident, FIG. 8B illustrates a given region of an output image, FIG. 8C illustrates of the second image to be rendered, while FIG. 8D illustrates an imaginary plane 802 depicting a plurality of copies of the rendered second image, in accordance with an embodiment of the present disclosure.

In FIG. 8A, light emanating from a second image renderer 804 is shown to be split into 9 directions to produce 9 projections of the second image. Such 9 projections of the second image form 9 non-overlapping copies of the second image upon being incident on the imaginary plane 802, the imaginary plane 802 being arranged between a first array of micro-prisms and an optical element. Notably, a hatched region of the imaginary plane 802 corresponds to the region of the image plane whereat the gaze direction of the user is focused.

In FIG. 8B, the given region of the output image is shown to comprise four equal sized portions A, B, C, and D.

In FIG. 8C, the second image to be rendered is also shown to comprise the four equal sized portions A, B, C, and D. As shown, an arrangement of the portions A, B, C, and D in the second image is different from an arrangement of the portions A, B, C, and D in the given region of the output image. Since the gaze direction of the user corresponds to the region of the image plane whereat four of the plurality of projections of the second image would be incident, the second image would require further processing prior to rendering. Notably, positions of the four portions A, B, C, and D of the second image would be diagonally swapped prior to rendering. In such a case, the positions of the portions A and D are swapped with each other, and the positions of the portions B and C are swapped with each other. Therefore, the second image of FIG. 8C is to be rendered in order to produce the given region of the output image of FIG. 8B.

In FIG. 8D, the imaginary plane 802 depicts 9 copies of the rendered second image. Different portions of four neighbouring copies of the second image lie within the hatched region of the imaginary plane 802. A given portion of the plurality of projections of the second image that corresponds to said portions lying within the hatched region produces the given region of the output image at the image plane.

FIGS. 8A, 8B, 8C and 8D merely illustrate one example scenario, which should not unduly limit the scope of the claims herein. A person skilled in the art will recognize many variations, alternatives, and modifications of embodiments of the present disclosure. For example, light emanating from the second image renderer 804 may be split into 4 directions to produce 4 projections of the second image.

Figure 9A:
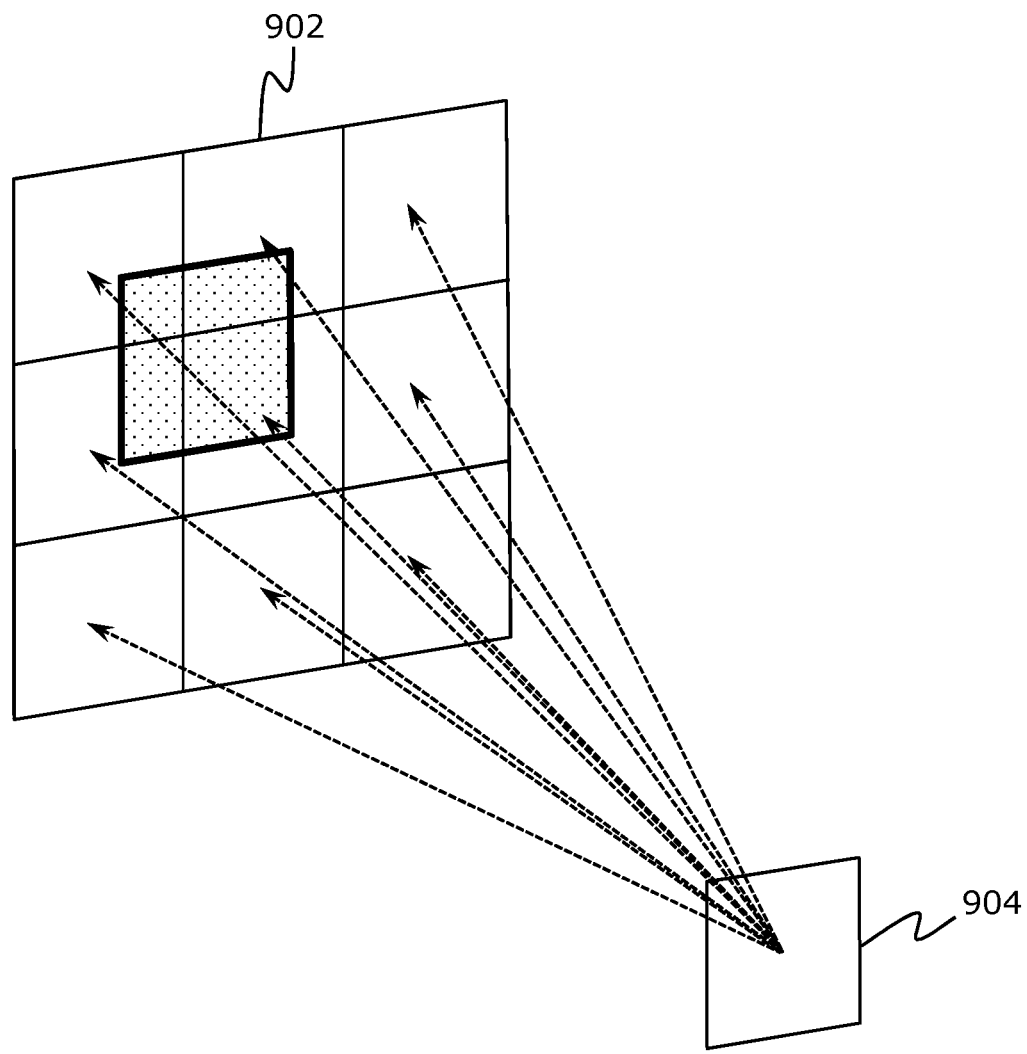
FIG. 9A illustrates yet another example scenario where gaze direction of a user corresponds to a region of an image plane whereat four of the plurality of projections of the second image would be incident.
Figure 9B:
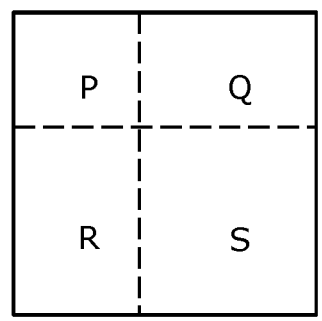
FIG. 9B illustrates a given region of the output image.
Figure 9C:
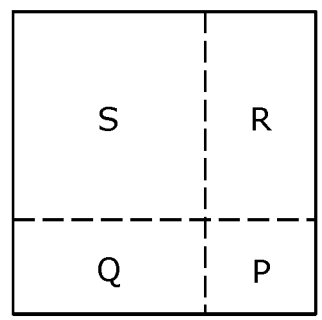
Figure 9D:
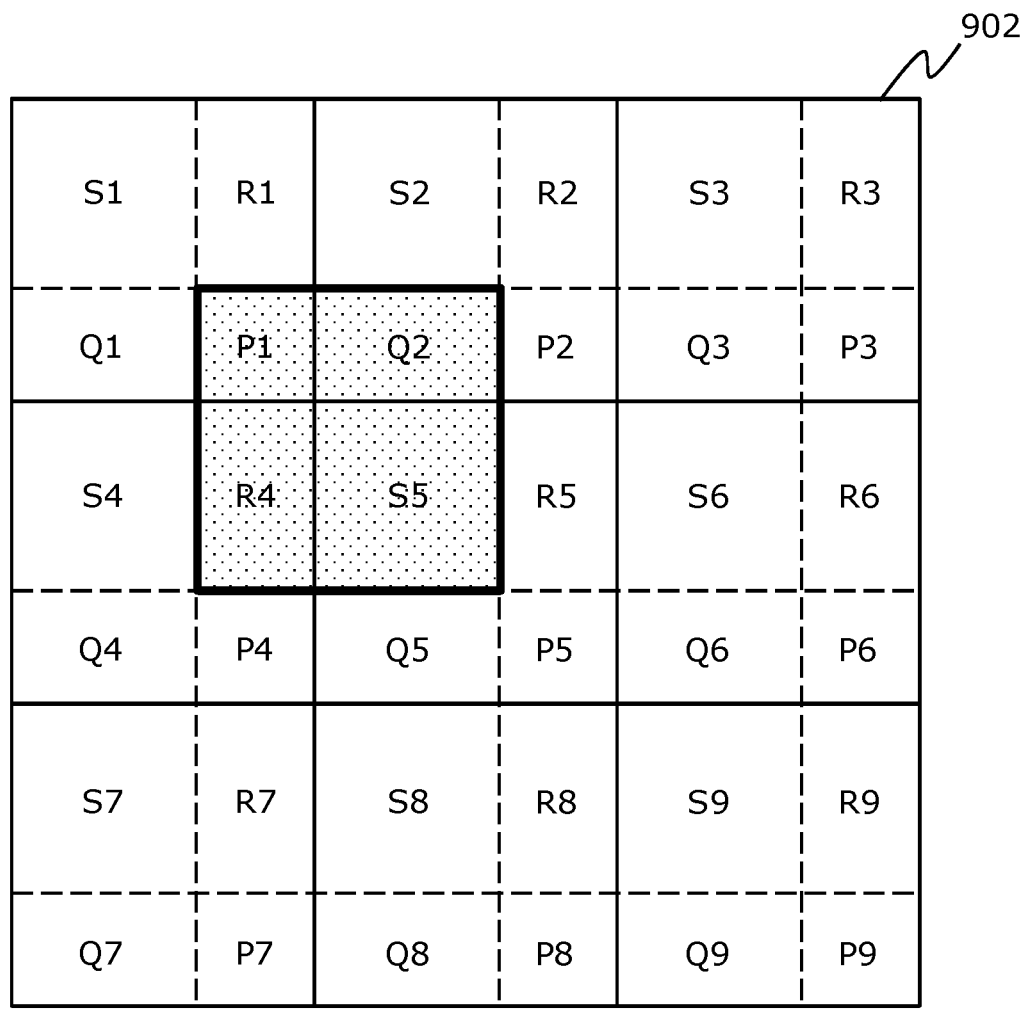
FIG. 9D illustrates an imaginary plane depicting a plurality of copies of the rendered second image, in accordance with an embodiment of the present disclosure.

Referring to FIG. 9A, illustrated is yet another example scenario where gaze direction of a user corresponds to a region of an image plane whereat four of a plurality of projections of a second image would be incident, FIG. 9B illustrates a given region of an output image, FIG. 9C illustrates the second image to be rendered, while FIG. 9D illustrates an imaginary plane 902 depicting a plurality of copies of the rendered second image, in accordance with an embodiment of the present disclosure.

In FIG. 9A, light emanating from a second image renderer 904 is shown to be split into 9 directions to produce 9 projections of the second image. Such 9 projections of the second image form 9 non-overlapping copies of the second image upon being incident on the imaginary plane 902, the imaginary plane 902 being arranged between a first array of micro-prisms and an optical element. Notably, a hatched region of the imaginary plane 902 corresponds to the region of the image plane whereat the gaze direction of the user is focused.

In FIG. 9B, the given region of the output image is shown to comprise four unequal sized portions P, Q, R, and S.

In FIG. 9C, the second image to be rendered is also shown to comprise the four unequal sized portions P, Q, R, and S. As shown, an arrangement of the portions P, Q, R, and S in the second image is different from an arrangement of the portions P, Q, R, and S in the given region of the output image. Since the gaze direction of the user corresponds to the region of the image plane whereat four of the plurality of projections of the second image would be incident, the second image would require further processing prior to rendering. Notably, positions of the four portions P, Q, R, and S of the second image would be diagonally swapped prior to rendering. In such a case, the positions of the portions P and S are swapped with each other, and the positions of the portions Q and R are swapped with each other. Therefore, the second image of FIG. 9C is to be rendered in order to produce the given region of the output image of FIG. 9B.

In FIG. 9D, the imaginary plane 902 depicts 9 copies of the rendered second image. Different portions of four neighbouring copies of the second image lie within the hatched region of the imaginary plane 902. A given portion of the plurality of projections of the second image that corresponds to said portions lying within the hatched region produces the given region of the output image at the image plane.

FIGS. 9A, 9B, 9C and 9D merely illustrate one example scenario, which should not unduly limit the scope of the claims herein. A person skilled in the art will recognize many variations, alternatives, and modifications of embodiments of the present disclosure. For example, light emanating from the second image renderer 904 may be split into 4 directions to produce 4 projections of the second image.

Figure 10A:
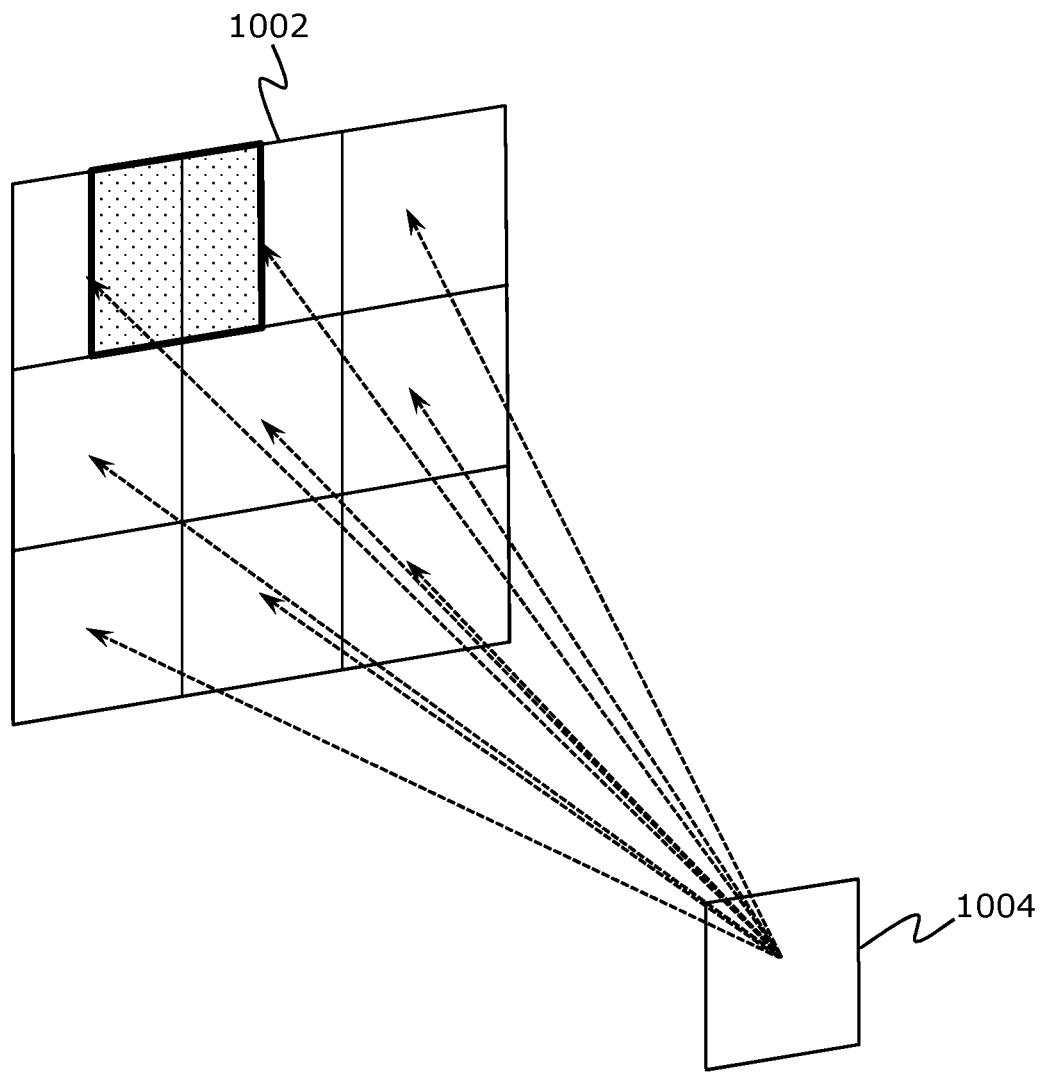
FIG. 10A illustrates still another example scenario where gaze direction of a user corresponds to a region of the image plane whereat two of the plurality of projections of the second image would be incident.
Figure 10B:
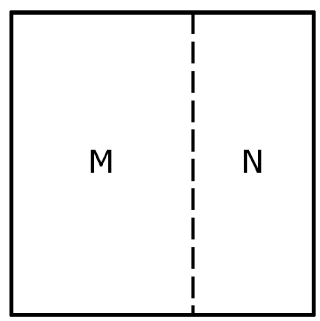
FIG. 10B illustrates a given region of the output image.
Figure 10C:
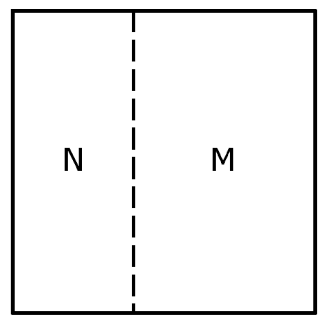
Figure 10D:
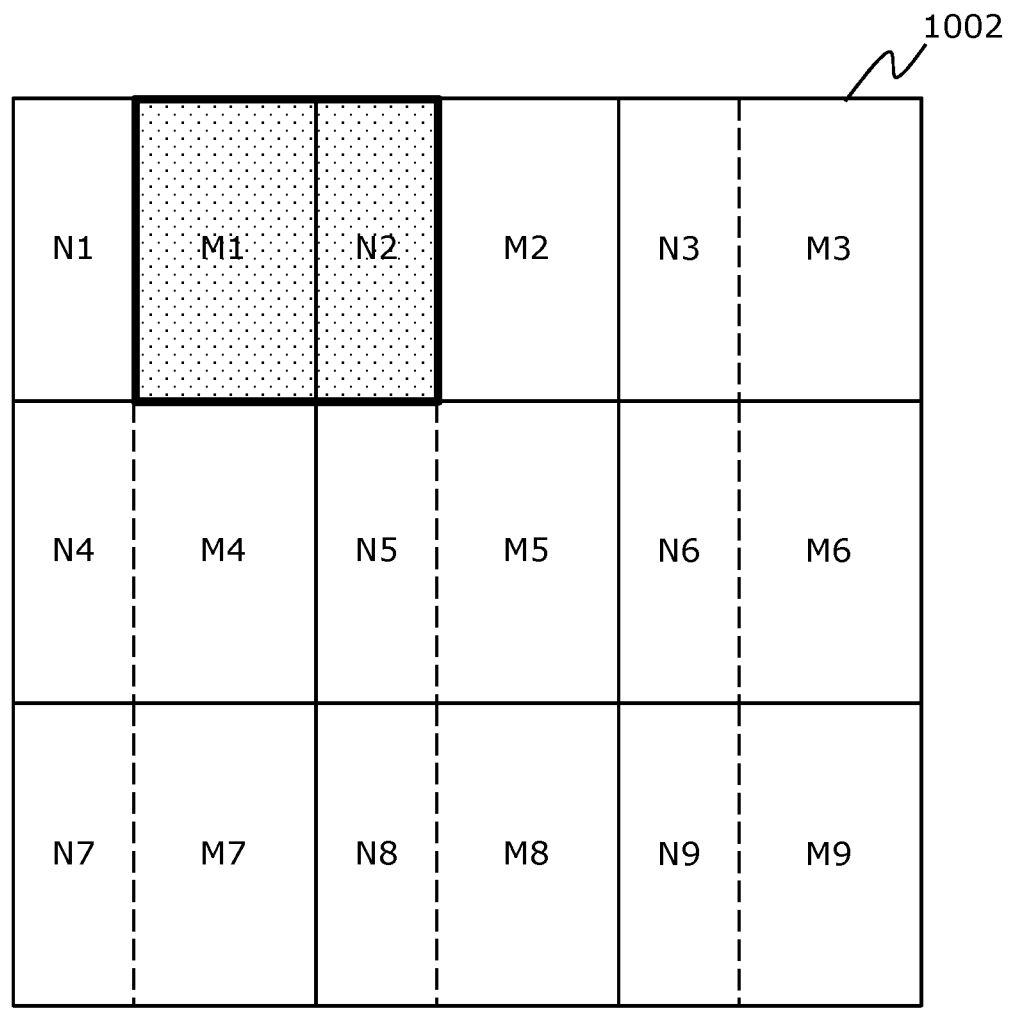
FIG. 10D illustrates an imaginary plane depicting a plurality of copies of the rendered second image, in accordance with an embodiment of the present disclosure.

Referring to FIG. 10A, illustrated is still another example scenario where gaze direction of a user corresponds to a region of the image plane whereat two of a plurality of projections of a second image would be incident, FIG. 10B illustrates a given region of an output image, FIG. 10C illustrates the second image to be rendered, while FIG. 10D illustrates an imaginary plane 1002 depicting a plurality of copies of the rendered second image, in accordance with an embodiment of the present disclosure.

In FIG. 10A, light emanating from a second image renderer 1004 is shown to be split into 9 directions to produce 9 projections of the second image. Such 9 projections of the second image form 9 non-overlapping copies of the second image upon being incident on the imaginary plane 1002, the imaginary plane 1002 being arranged between a first array of micro-prisms and an optical element. Notably, a hatched region of the imaginary plane 1002 corresponds to the region of the image plane whereat the gaze direction of the user is focused.

In FIG. 10B, the given region of the output image is shown to comprise two unequal sized portions M and N.

In FIG. 10C, the second image to be rendered is also shown to comprise the two unequal sized portions M and N. As shown, an arrangement of the portions M and N in the second image is different from an arrangement of the portions M and N in the given region of the output image. Since the gaze direction of the user corresponds to the region of the image plane whereat two of the plurality of projections of the second image would be incident, the second image would require further processing prior to rendering. Notably, positions of the two portions M and N of the second image would be swapped prior to rendering. Therefore, the second image of FIG. 10C is to be rendered in order to produce the given region of the output image of FIG. 10B.

In FIG. 10D, the imaginary plane 1002 depicts 9 copies of the rendered second image. Different portions of two neighbouring copies of the second image lie within the hatched region of the imaginary plane 1002. A given portion of the plurality of projections of the second image that corresponds to said portions lying within the hatched region produces the given region of the output image at the image plane.

FIGS. 10A, 10B, 10C and 10D merely illustrate one example scenario, which should not unduly limit the scope of the claims herein. A person skilled in the art will recognize many variations, alternatives, and modifications of embodiments of the present disclosure. For example, light emanating from the second image renderer 1004 may be split into 4 directions to produce 4 projections of the second image.

Figure 11A:
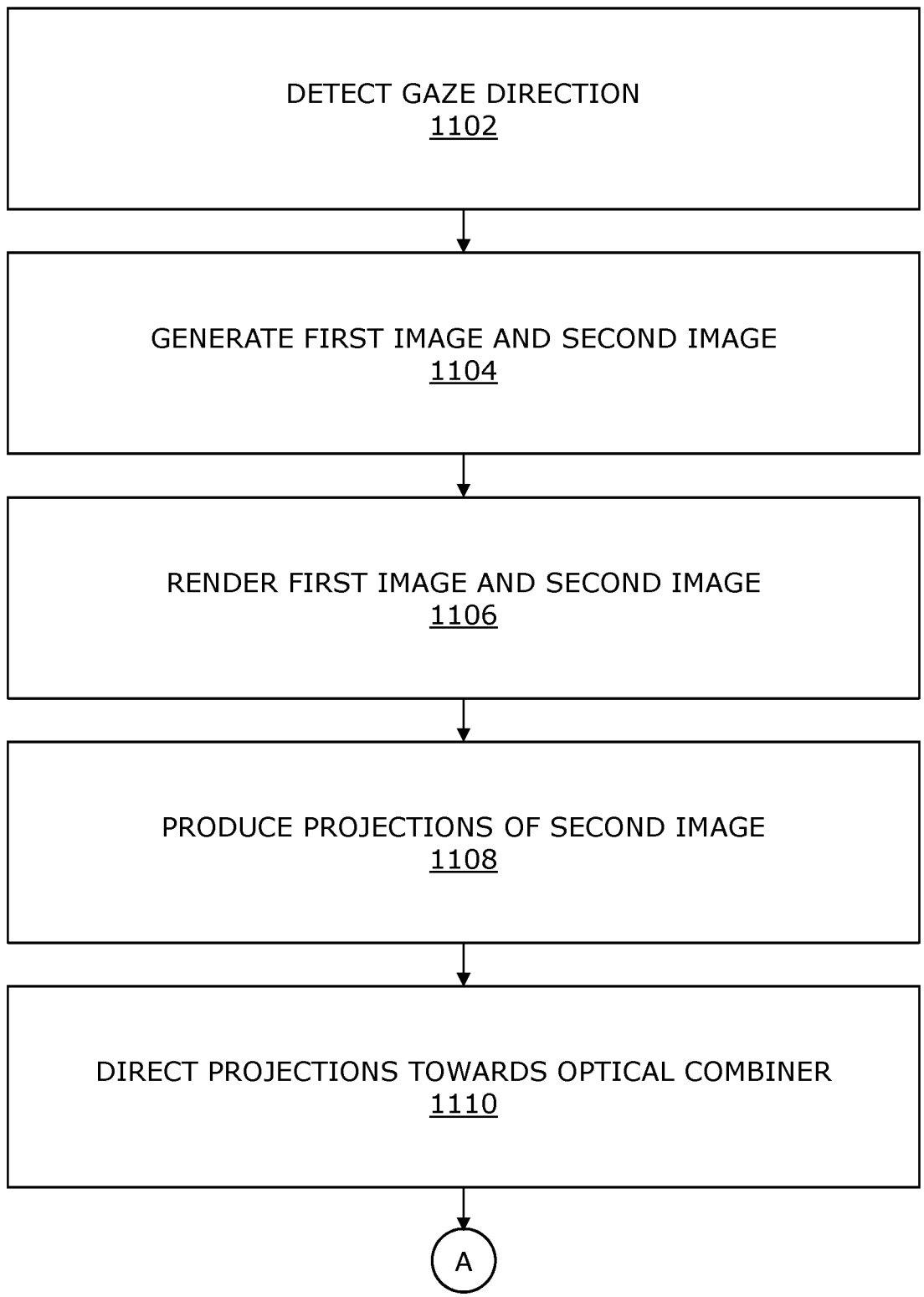
FIGS. 11A and 11B illustrate steps of a method of displaying, in accordance with an embodiment of the present disclosure.
Figure 11B:
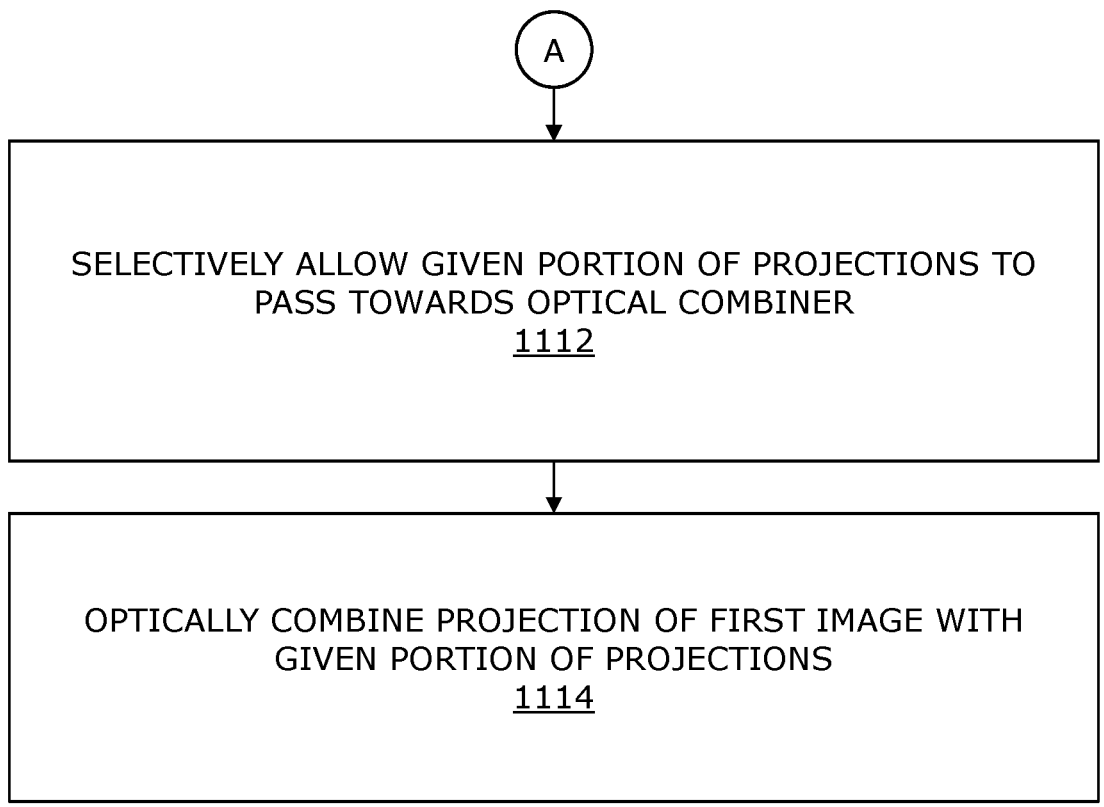

Referring to FIGS. 11A and 11B, illustrated are steps of a method of displaying, in accordance with an embodiment of the present disclosure.

At a step 1102, a gaze direction of a user is detected with respect to an image plane.

At a step 1104, an input image is processed, based upon the detected gaze direction, to generate a first image and a second image.

At a step 1106, the first image and the second image are rendered, via a first image renderer per eye and a second image renderer per eye of the display apparatus, respectively.

At a step 1108, light emanating from pixels of the second image renderer is split, via a first array of micro-prisms of the display apparatus, into a plurality of directions to produce a plurality of projections of the second image. Each micro-prism of the first array splits light emanating from at least one corresponding pixel into said plurality of directions.

At a step 1110, an optical element of the display apparatus is employed to direct the plurality of projections of the second image towards an optical combiner of the display apparatus. The optical element is arranged on an optical path between the first array of micro-prisms and the optical combiner.

At a step 1112, an optical shutter of the display apparatus is controlled to selectively allow a given portion of the plurality of projections of the second image to pass through towards the optical combiner, whilst blocking a remaining portion of the plurality of projections of the second image. The optical shutter is arranged on said optical path, between the optical element and the optical combiner. The optical shutter is controlled based upon the detected gaze direction, whilst the first image and the second image are being rendered.

At a step 1114, a projection of the first image is optically combined, via the optical combiner, with the given portion of the plurality of projections of the second image, to produce on the image plane an output image having a spatially-variable angular resolution.

The steps 1102, 1104, 1106, 1108, 1110, 1112, and 1114 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
   means for detecting a gaze direction of a user with respect to an image plane;
   a processor coupled to said means, wherein the processor or an image source communicably coupled to the processor is configured to process an input image, based upon the detected gaze direction, to generate a first image and a second image;
   a first image renderer per eye, the first image renderer being employed to render the first image;
   a second image renderer per eye, the second image renderer being employed to render the second image;
   an optical combiner;
   a first array of micro-prisms arranged in a proximity of an image rendering surface of the second image renderer, wherein the micro-prisms of the first array split light emanating from pixels of the second image renderer into a plurality of directions to produce a plurality of projections of the second image, and wherein each micro-prism of the first array splits light emanating from at least one corresponding pixel into said plurality of directions;

an optical element arranged on an optical path between the first array of micro-prisms and the optical combiner, the optical element being employed to direct the plurality of projections of the second image towards the optical combiner; and an optical shutter arranged on said optical path, between the optical element and the optical combiner, wherein the optical shutter selectively allows a given portion of the plurality of projections of the second image to pass through towards the optical combiner, whilst blocking a remaining portion of the plurality of projections of the second image, wherein the optical combiner optically combines a projection of the first image with the given portion of the plurality of projections of the second image, to produce on the image plane an output image having a spatially-variable angular resolution, further wherein the processor controls the optical shutter based upon the detected gaze direction, whilst the first image and the second image are being rendered;

wherein the processor is further configured to:
  detect whether or not the gaze direction of the user corresponds exactly to a region of the image plane whereat any one of the plurality of projections of the second image would be incident;
  render the second image via the second image renderer, when the gaze direction of the user corresponds exactly to said region; and
  further process the second image prior to rendering, when the gaze direction of the user does not correspond exactly to said region;

wherein when further processing the second image, the processor is configured to:
  divide the second image into two portions when the gaze direction corresponds to a region of the image plane whereat two of the plurality of projections of the second image would be incident, and swap positions of the two portions; or
  divide the second image into four portions when the gaze direction of the user corresponds to a region of the image plane whereat four of the plurality of projections of the second image would be incident, and diagonally swap positions of the four portions.

2. The display apparatus of claim 1, further comprising a collimator arranged between the second image renderer and the first array of micro-prisms.

3. The display apparatus of claim 1, further comprising a condenser lens per face of a given micro-prism of the first array of micro-prisms, wherein a given condenser lens is arranged over a given face of the given micro-prism to converge a divergent light beam emerging from the given face into a convergent light beam.

4. The display apparatus of claim 1, wherein a given micro-prism of the first array of micro-prisms has a wedge-like shape.

5. The display apparatus of claim 1, wherein the first array of micro-prisms is static.

6. The display apparatus of claim 1, wherein the first array of micro-prisms is controllable.

7. The display apparatus of claim 1, wherein the first array of micro-prisms is exchangeable, via mechanical switching.

8. The display apparatus of claim 1, wherein a number of directions in the plurality of directions is fixed.

9. A method of displaying, via a display apparatus, the method comprising:
  detecting a gaze direction of a user with respect to an image plane;
  processing an input image, based upon the detected gaze direction, to generate a first image and a second image;
  rendering, via a first image renderer and a second image renderer of the display apparatus, the first image and the second image, respectively;
  splitting, via a first array of micro-prisms of the display apparatus, light emanating from pixels of the second image renderer into a plurality of directions to produce a plurality of projections of the second image, wherein each micro-prism of the first array splits light emanating from at least one corresponding pixel into said plurality of directions;
  employing an optical element of the display apparatus to direct the plurality of projections of the second image towards an optical combiner of the display apparatus, the optical element being arranged on an optical path between the first array of micro-prisms and the optical combiner,
  controlling an optical shutter of the display apparatus to selectively allow a given portion of the plurality of projections of the second image to pass through towards the optical combiner, whilst blocking a remaining portion of the plurality of projections of the second image, wherein the optical shutter is arranged on said optical path, between the optical element and the optical combiner, and wherein the optical shutter is controlled based upon the detected gaze direction, whilst the first image and the second image are being rendered;
  optically combining, via the optical combiner, a projection of the first image with the given portion of the plurality of projections of the second image, to produce on the image plane an output image having a spatially-variable angular resolution;
  detecting whether or not the gaze direction of the user corresponds exactly to a region of the image plane whereat any one of the plurality of projections of the second image would be incident;
  rendering the second image via the second image renderer, when the gaze direction of the user corresponds exactly to said region; and
  further processing the second image prior to rendering, when the gaze direction of the user does not correspond exactly to said region;
  wherein when further processing the second image, the method comprises:
    dividing the second image into two portions when the gaze direction corresponds to a region of the image plane whereat two of the plurality of projections of the second image would be incident, and swapping positions of the two portions; or
    dividing the second image into four portions when the gaze direction of the user corresponds to a region of the image plane whereat four of the plurality of projections of the second image would be incident, and diagonally swapping positions of the tour portions.

10. The method of claim 9, wherein the display apparatus further comprises a condenser lens per face of a given micro-prism of the first array of micro-prisms, and wherein the method comprises converging, via a given condenser lens arranged over a given face of the given micro-prism, a divergent light beam emerging from the given face into a convergent light beam.

\* \* \* \* \*